(12) United States Patent
Kuwabara et al.

(10) Patent No.: US 11,342,990 B2
(45) Date of Patent: May 24, 2022

(54) STATE ESTIMATING DEVICE AND COMMUNICATION SYSTEM

(71) Applicant: NIPPON TELEGRAPH AND TELEPHONE CORPORATION, Tokyo (JP)

(72) Inventors: Seiki Kuwabara, Tokyo (JP); Wataru Kawakami, Tokyo (JP); Hideki Nishizawa, Tokyo (JP); Seiji Okamoto, Tokyo (JP); Akira Hirano, Tokyo (JP); Shokei Kobayashi, Tokyo (JP); Tetsuro Inui, Tokyo (JP); Takuya Oda, Tokyo (JP); Fumikazu Inuzuka, Tokyo (JP); Takafumi Tanaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/968,741

(22) PCT Filed: Feb. 13, 2019

(86) PCT No.: PCT/JP2019/005017
§ 371 (c)(1),
(2) Date: Aug. 10, 2020

(87) PCT Pub. No.: WO2019/159938
PCT Pub. Date: Aug. 22, 2019

(65) Prior Publication Data
US 2021/0013963 A1    Jan. 14, 2021

(30) Foreign Application Priority Data

Feb. 13, 2018  (JP) .............................. JP2018-023542
Oct. 9, 2018   (JP) .............................. JP2018-191192

(51) Int. Cl.
*H04B 10/08*  (2006.01)
*H04B 10/079* (2013.01)

(52) U.S. Cl.
CPC ................................ *H04B 10/0795* (2013.01)

(58) Field of Classification Search
CPC .......... H04B 10/0795; H04B 10/07953; H04B 10/0775; H04B 10/0791; H04B 10/0779; H04B 10/60; H04J 14/04
(Continued)

(56) References Cited

U.S. PATENT DOCUMENTS 10,419,117 B2 *  9/2019  Tanimura ............. H04B 10/616
2009/0028554 A1  1/2009  Anderson et al.
(Continued)

FOREIGN PATENT DOCUMENTS

JP   H10160625 A    6/1998
JP   2009512286 A   3/2009
(Continued)

OTHER PUBLICATIONS

International Search Report (in English and Japanese) issued in PCT/JP2019/005017, dated Apr. 9, 2019.

*Primary Examiner* — Hanh Phan
(74) *Attorney, Agent, or Firm* — Harness, Dickey & Pierce, P.L.C.

(57) ABSTRACT

A state estimating device includes a pre-processing unit and an estimating unit. The pre-processing unit acquires data representing at one or more of a phase of a signal transmitted from a transmission unit of a transmission device and received at a reception unit of another transmission device via a transmission path, a reception strength, a reception quality, a voltage after conversion into an electric signal, and a signal processing parameter used in reception processing, and processes the acquired data into feature data to be used (Continued)

for state estimation. The estimating unit estimates a state of the transmission path, an abnormal state of the transmission unit, or an abnormal state of the reception unit, on the basis of the feature data.

17 Claims, 23 Drawing Sheets

(58) Field of Classification Search
USPC ........ 398/33, 38, 25, 26, 27, 10, 13, 17, 20, 398/23, 24, 44, 79, 141, 158, 159; 356/73.1
See application file for complete search history.

(56) References Cited

U.S. PATENT DOCUMENTS

| | | | |
|---|---|---|---|
| 2009/0214201 A1* | 8/2009 | Oda ................... | H04B 10/6971 398/25 |
| 2009/0317079 A1 | 12/2009 | Yoshida | |
| 2012/0263457 A1* | 10/2012 | Mahlab .............. | H04B 10/0795 398/25 |
| 2015/0207562 A1* | 7/2015 | Brumley, II .......... | G06N 5/022 398/125 |
| 2016/0373187 A1* | 12/2016 | Oda ................... | H04B 10/0793 |
| 2018/0337726 A1 | 11/2018 | Oda et al. | |

FOREIGN PATENT DOCUMENTS

| | | |
|---|---|---|
| JP | 2017085355 A | 5/2017 |
| WO | WO-2008065784 A1 | 6/2008 |
| WO | WO-2011077429 A1 | 6/2011 |
| WO | WO-2017090616 A1 | 6/2017 |

* cited by examiner

US 11,342,990 B2

STATE ESTIMATING DEVICE AND COMMUNICATION SYSTEM

CROSS-REFERENCE TO RELATED APPLICATIONS

This application is a 371 National Stage of International Application No. PCT/JP2019/005017, filed on Feb. 13, 2019, which claims priority to Japanese Application No. 2018-023542, filed on Feb. 13, 2018 and Japanese Application No. 2018-191192, filed Oct. 9, 2018. The entire disclosures of the above applications are incorporated herein by reference.

TECHNICAL FIELD

The present invention relates to a state estimating device and a communication system.

BACKGROUND ART

FIG. 24 is a diagram illustrating an example of a conventional optical communication system according to an optical digital coherent method.

The optical communication system illustrated in the Figure is provided with a plurality of transponders 90. The transponder 90 at the transmitting side will be written as transponder 90A, and the transponder 90 at the receiving side will be written as transponder 90B. The transponder 90A and transponder 90B have similar configurations. The transponder 90A and transponder 90B communicate via optical fiber (single-core fiber, multicore fiber), copper cable, wireless, or the like. In the Figure, description will be made by way of an example of a case where communication is performed via optical fiber.

Signals input to the transponder 90A from an external device are terminated at an OTN (Optical Transport Network) framer, and mapped to OTN frames. OTN frames are subjected to imparting of error correction code, transmission linear equalization processing, and digital-to-analog conversion processing, at a downstream DSP (Digital Signal Processor), and thereafter are converted from electrical signals into light signals at an optical transmission unit, and sent to the opposed transponder 90B via optical fiber.

Light signals sent out from the optical transmission unit of the transponder 90B are received at an optical reception unit of the transponder 90A via optical fiber, and are converted into electrical signals. At the DSP, electrical signals are subjected to analog-to-digital conversion processing, reception linear equalization processing, and transmission path estimation, and OTN frame signals are demodulated. OTN frame signals obtained by correcting signals that could not be correctly demodulated in part, at a downstream error correction coding processing unit, are converted at the OTN framer into signals of a format appropriate for an external device, and output.

In a case where a failure occurs on the optical fiber or the like and the signals deteriorate beyond equalization processing capabilities of a reception linear equalization processing unit, communication is lost. Once communication is lost, the system recognizes that a failure has occurred, and processing for isolating the failure is implemented by mobilizing the system and human staff. In a case where a breach of optical fiber has occurred, an OTDR (Optical Time Domain Reflectometer) is used to identify the location thereof.

When failures occur on the optical fiber, device costs and running costs increase, such as providing a device having testing functions besides those for communication, removing the transmission device and installing a testing device, or the like. The invention in PTL 1 enables preliminary indication of failure occurring on the transmission path to be detected, by collecting and statistically processing signals or physical state data accompanying signal processing.

CITATION LIST

Patent Literature

[PTL 1] Japanese Patent Application Publication No. 2017-85355

SUMMARY OF THE INVENTION

Technical Problem

However, although the method in PTL 1 can detect occurrence of failure on an optical fiber transmission path, and preliminary indication thereof, using physical state data, the cause of failure (bending, tension, compression, fracture, vibrations, etc.) and the degree thereof (radius of bending, strength of tension, amplitude of vibration and vibration cycle, etc.) are not ascertained. Accordingly, there has been a problem in that detailed detecting of preliminary indication of failure where the cause of failure and the degree thereof is necessary in order to promptly perform recovery work at the time of a failure occurring.

In light of the foregoing circumstances, it is an object of the present invention to provide a state estimating device and communication system capable of detecting preliminary indication of failure occurring in data transmission in further detail, while reducing costs.

Means for Solving the Problem

One aspect of the present invention is a state estimating device including a pre-processing unit that acquires signal reception data representing one or more of a phase of a signal transmitted from a transmission unit of a transmission device and received at a reception unit of another transmission device via a transmission path, a reception strength, a reception quality, a voltage after conversion into an electric signal, and a signal processing parameter used in reception processing, and processes the acquired signal reception data into feature data to be used for state estimation, and an estimating unit that estimates a state of the transmission path, an abnormal state of the transmission unit, or an abnormal state of the reception unit, on the basis of the feature data.

One aspect of the present invention is the above state estimating device, where the state of the transmission path is one or more of whether or not there is any bending, a radius of bending, and a temperature change.

One aspect of the present invention is the above state estimating device, where the feature data includes at least one of phase plane state data representing a phase on a phase plane, polar coordinate data representing a phase on a polar coordinates plane, Fourier transform data where the polar coordinate data has been subjected to fast Fourier transform, histogram data representing a rate of occurrence of the signals in the phase plane state data or the polar coordinate data, histogram data representing a rate of occurrence of signals in any one of or a combination of two or more of the reception strength, the reception quality, the voltage, and the signal processing parameter, and time-series data representing change in a time series of the reception strength, the reception quality, the voltage, or the signal processing parameter.

One aspect of the present invention is the above state estimating device, where the estimating unit performs estimation using machine learning.

One aspect of the present invention is the above state estimating device, where the estimating unit has a plurality of partial estimating units that estimate a part of a state included in any one of a state of the transmission path, an abnormal state of the transmission unit, and an abnormal state of the reception unit, using at least part of the feature data, and estimates the state of the transmission path, an abnormal state of the transmission unit, or an abnormal state of the reception unit, on the basis of estimation results by the plurality of partial estimating units that each estimate a different part of a state.

One aspect of the present invention is the above state estimating device, where the pre-processing unit or the estimating unit is realized by hardware, by a processor that executes a program, or by a combination of hardware and a processor that executes a program.

One aspect of the present invention is the above state estimating device, where the transmission path is configured of a plurality of physical paths. The pre-processing unit acquires the signal reception data for each of the physical paths, and generates feature data to be used for state estimation from the acquired signal reception data. The estimating unit estimates a state of the physical path on the basis of the feature data, for each of the physical paths. The state estimating device further includes an integrated estimating unit that derives state estimation results of the transmission path on the basis of the state of each of the physical paths estimated by the estimating unit.

One aspect of the present invention is the above state estimating device, where the pre-processing unit acquires the signal reception data for each of the physical paths when light signals using the same light source are transmitted to two or more, or all, of the plurality of physical paths.

One aspect of the present invention is the above state estimating device, where the pre-processing unit acquires the signal reception data for each of the physical paths when light signals using different light sources are transmitted to each of the plurality of physical paths.

One aspect of the present invention is the above state estimating device, where the transmission path is any one of, or a combination of two or more of, multicore fiber, multimode fiber, and multifiber.

One aspect of the present invention is the above state estimating device, where the transmission path has a mode multiplexer that multiplexes a plurality of single mode light signals so as to be converted into multimode light signals, a multimode fiber that transmits the multimode light signals converted by the mode multiplexer, and a mode demultiplexer that demultiplexes the multimode light signals transmitted over the multimode fiber into single-mode light signals.

One aspect of the present invention is the above state estimating device, where the pre-processing unit acquires the signal reception data at the time of transmitting light signals in each of both directions for each of the physical paths, and generates feature data to be used for state estimation from the acquired signal reception data. The estimating unit estimates the state of the physical paths on the basis of the feature data, regarding each of both directions for each of the physical paths. The integrated estimating unit derives state estimation results for the transmission path on the basis of the state of each of the physical paths estimated regarding each of both directions by the estimating unit.

One aspect of the present invention is a communication system including a transmission device, and any one of the above state estimating devices.

Effects of the Invention

According to the present invention, preliminary indication of failure in data transmission can be detected in further detail, while reducing costs.

DESCRIPTION OF EMBODIMENTS

Embodiments of the present invention will be described in detail below with reference to the Figures. Hereinafter, in a case where there is a Y count of a function unit xxx, the Y count of function units XXX will be written respectively as function units XXX-1 to XXX-Y.

First Embodiment

Figure 1:
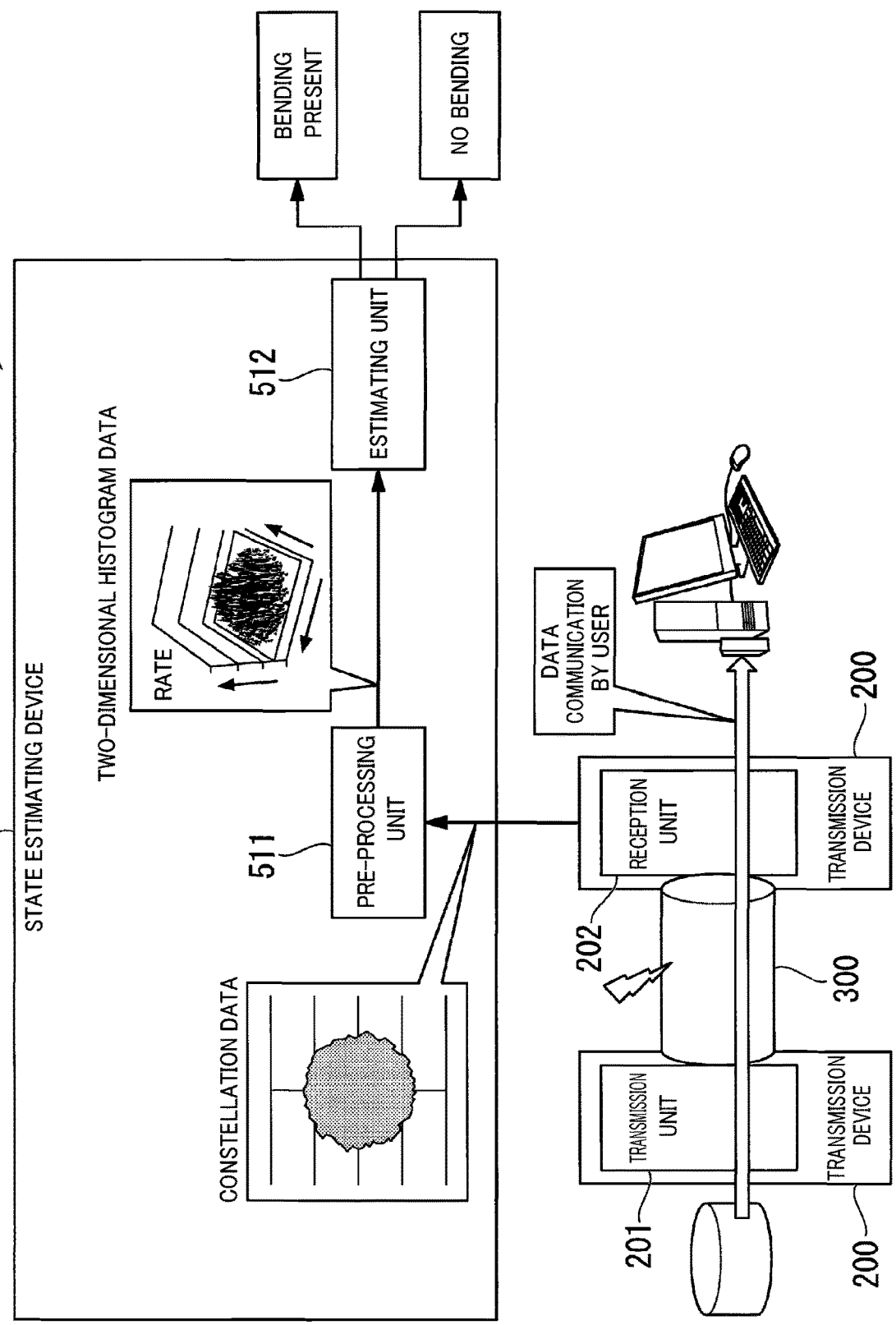
FIG. 1 is a block diagram illustrating a configuration of a communication system according to a first embodiment.

FIG. 1 is a block diagram illustrating a configuration of a communication system 101 according to a first embodiment of the present invention. The communication system 101 is provided with transmission devices 200 and a state estimating device 510. The number of transmission devices 200 that the communication system 101 is provided with is optional. The transmission devices 200 perform data communication via a transmission path 300. The transmission path 300 is optical fiber, for example.

The transmission devices 200 are provided with a transmission unit 201 and a reception unit 202. The transmission unit 201 transmits light signals via the transmission path 300. The reception unit 202 receives data via the transmission path 300. In the Figure, two transmission devices 200 are relaying data communication of a user by light signals.

The state estimating device 510 is provided with a pre-processing unit 511 and an estimating unit 512. The pre-processing unit 511 receives, from the reception unit 202 of the transmission device 200, constellation data (phase plane state data) indicating the phase plane state (constellation) of each signal received by the reception unit 202, as signal reception data. The pre-processing unit 511 plots the rate of occurrence of phases in constellation data and converts this into two-dimensional histogram data, which is output to the estimating unit 512 as feature data. The estimating unit 512 estimates abnormal states of the transmission devices 200 and transmission path 300 on the basis of the feature data received from the pre-processing unit 511, and outputs the results of estimation.

Note that after having converted the constellation data plotted on the phase plane from orthogonal coordinates into polar coordinates, the pre-processing unit 511 may plot the rate of occurrence of phases and generate two-dimensional histogram data. Also, the pre-processing unit 511 may perform fast Fourier transform after having converted the constellation data from orthogonal coordinates into polar coordinates, and plot the rate of occurrence on a two-dimensional plane such that the axes are the results of having performed fast Fourier transform for each of angle and distance from center, to obtain two-dimensional histogram data.

As a result of estimation by the estimating unit 512, abnormal states of the transmission path 300 such as bending of the optical fiber, tension, splicing point offset (fracture), temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Second Embodiment

Figure 2:
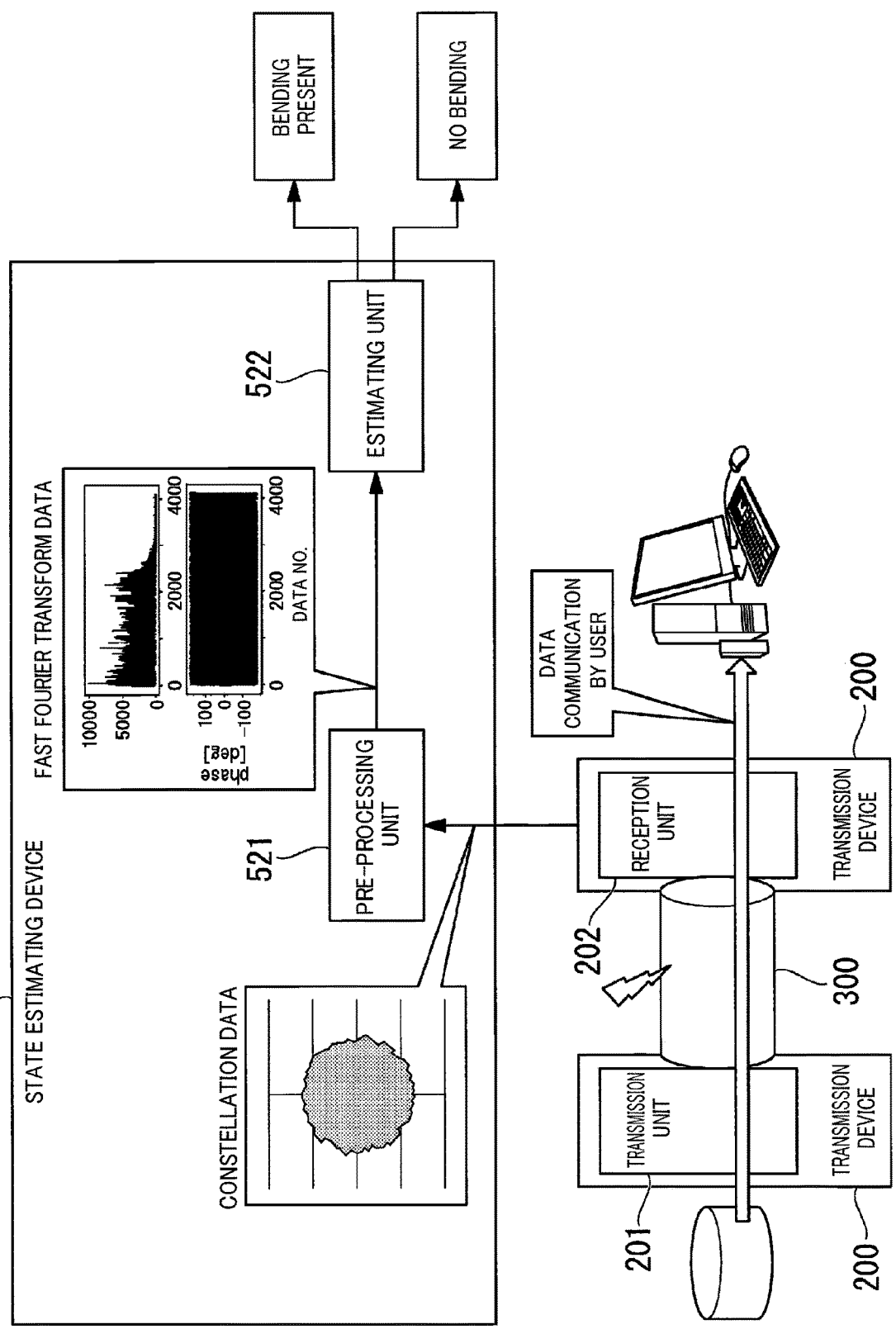
FIG. 2 is a block diagram illustrating a configuration of a communication system according to a second embodiment.

FIG. 2 is a block diagram illustrating a configuration of a communication system 102 according to a second embodiment of the present invention. In this Figure, parts that are the same as the communication system 101 according to the first embodiment illustrated in FIG. 1 are denoted by the same symbols, and description thereof will be omitted. The communication system 102 is provided with the transmission devices 200 and a state estimating device 520. The state estimating device 520 is provided with a pre-processing unit 521 and an estimating unit 522.

The pre-processing unit 521 converts constellation data acquired from the reception unit 202 of the transmission device 200 from orthogonal coordinates into polar coordinates. The pre-processing unit 521 processes data of each of angle and distance from center into fast Fourier transform data, and outputs this to the estimating unit 522 as feature data. Thus, the pre-processing unit 521 extracts features by processing constellation data plotted on a plane into Fourier transform data so that frequency analysis can be performed. The estimating unit 522 estimates abnormal states of the transmission devices 200 and transmission path 300 on the basis of the feature data received from the pre-processing unit 521, and outputs estimation results.

As a result of estimation by the estimating unit 522, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Third Embodiment

Figure 3:
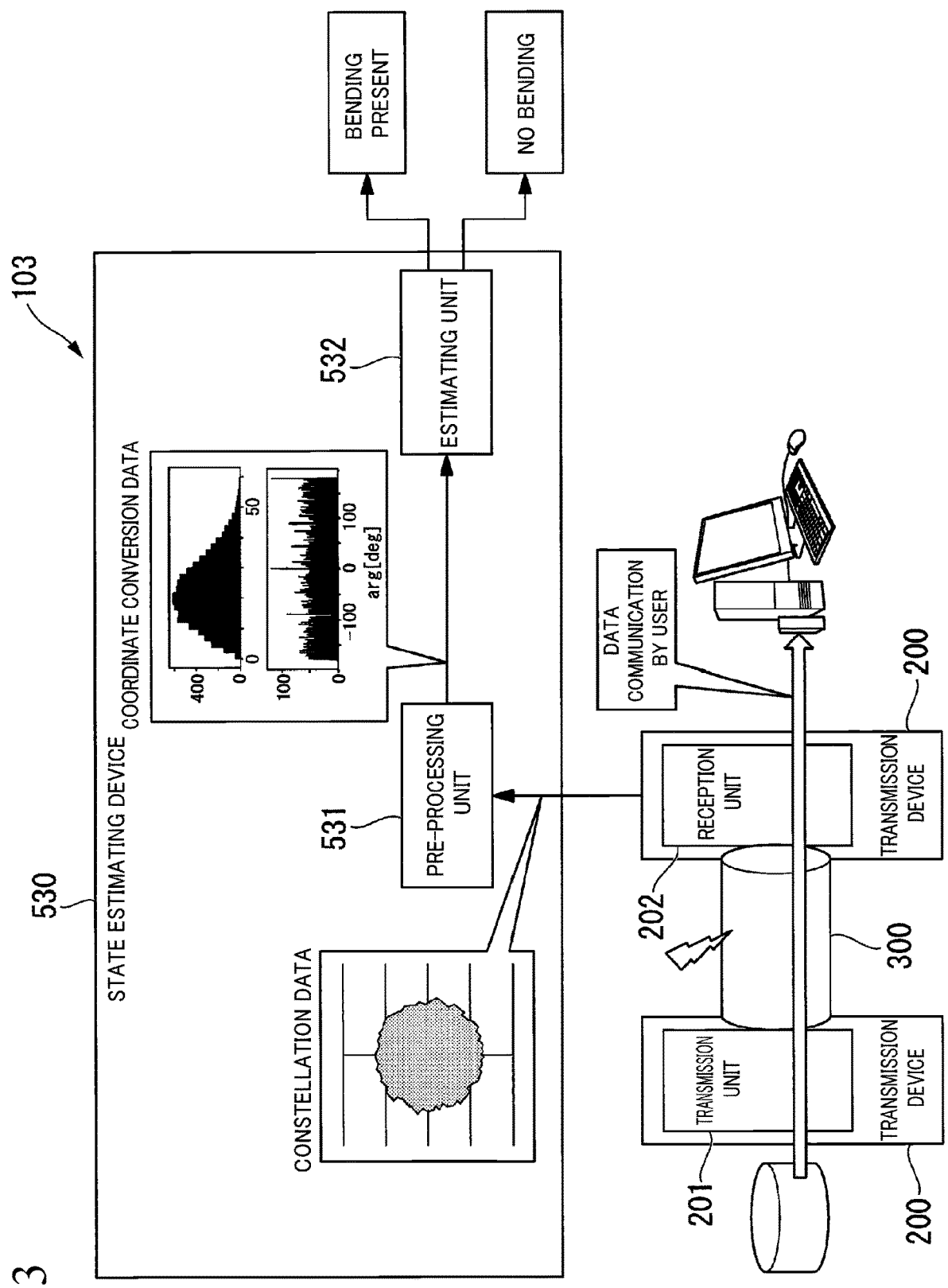
FIG. 3 is a block diagram illustrating a configuration of a communication system according to a third embodiment.

FIG. 3 is a block diagram illustrating a configuration of a communication system 103 according to a third embodiment of the present invention. In this Figure, parts that are the same as the communication system 101 according to the first embodiment illustrated in FIG. 1 are denoted by the same symbols, and description thereof will be omitted. The communication system 103 is provided with the transmission devices 200 and a state estimating device 530. The state estimating device 530 is provided with a pre-processing unit 531 and an estimating unit 532.

The pre-processing unit 531 processes constellation data acquired from the reception unit 202 of the transmission device 200 into coordinate-converted data, and outputs this to the estimating unit 532 as feature data. Specifically, the pre-processing unit 531 converts constellation data plotted on a plane from orthogonal coordinates into polar coordinates, and extracts features by plotting the rate of occurrence for each angle and distance from center at polar coordinates, for example. The estimating unit 532 estimates abnormal states of the transmission devices 200 and transmission path 300 on the basis of the feature data received from the pre-processing unit 531, and outputs estimation results. Note that the pre-processing unit 531 may output constellation data as it is to the estimating unit 532, as feature data.

As a result of estimation by the estimating unit 532, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Fourth Embodiment

Figure 4:
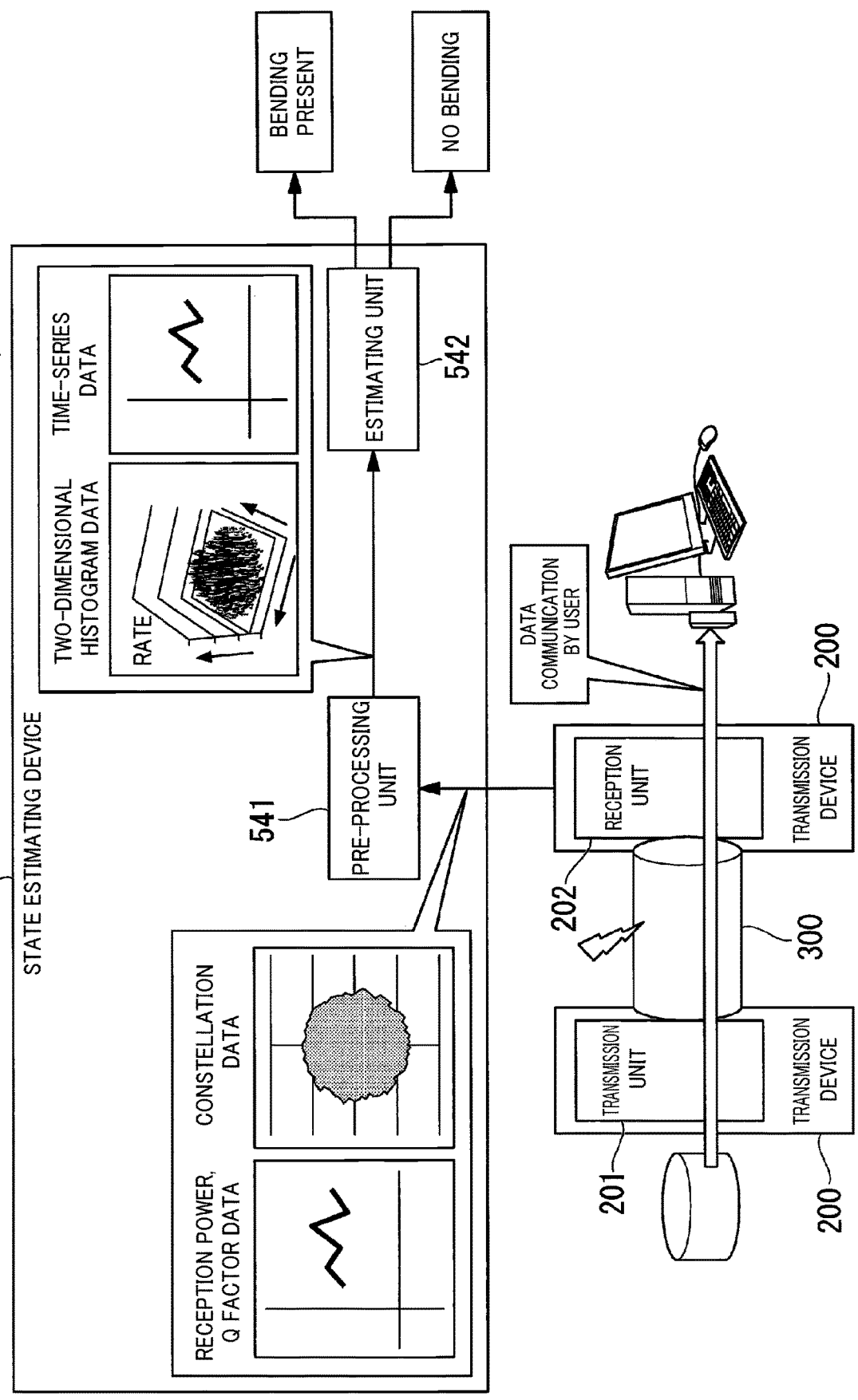
FIG. 4 is a block diagram illustrating a configuration of a communication system according to a fourth embodiment.

FIG. 4 is a block diagram illustrating a configuration of a communication system 104 according to a fourth embodiment of the present invention. In this Figure, parts that are the same as the communication system 101 according to the first embodiment illustrated in FIG. 1 are denoted by the same symbols, and description thereof will be omitted. The communication system 104 is provided with the transmission devices 200 and a state estimating device 540. The state estimating device 540 is provided with a pre-processing unit 541 and an estimating unit 542.

The pre-processing unit 541 acquires constellation data of the reception signals, and reception power and Q factor data, from the reception unit 202 of the transmission device 200 as signal reception data. The pre-processing unit 541 processes the constellation data into two-dimensional histogram data, and processes each of the reception power and Q factor data into time-series data. The pre-processing unit 541 combines the time-series data of the reception power and Q factor data with the two-dimensional histogram data of the constellation data, and outputs this to the estimating unit 542 as feature data. The estimating unit 542 estimates abnormal states of the transmission devices 200 and transmission path 300 on the basis of the feature data received from the pre-processing unit 541, and outputs estimation results.

As a result of estimation by the estimating unit 542, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Fifth Embodiment

Figure 5:
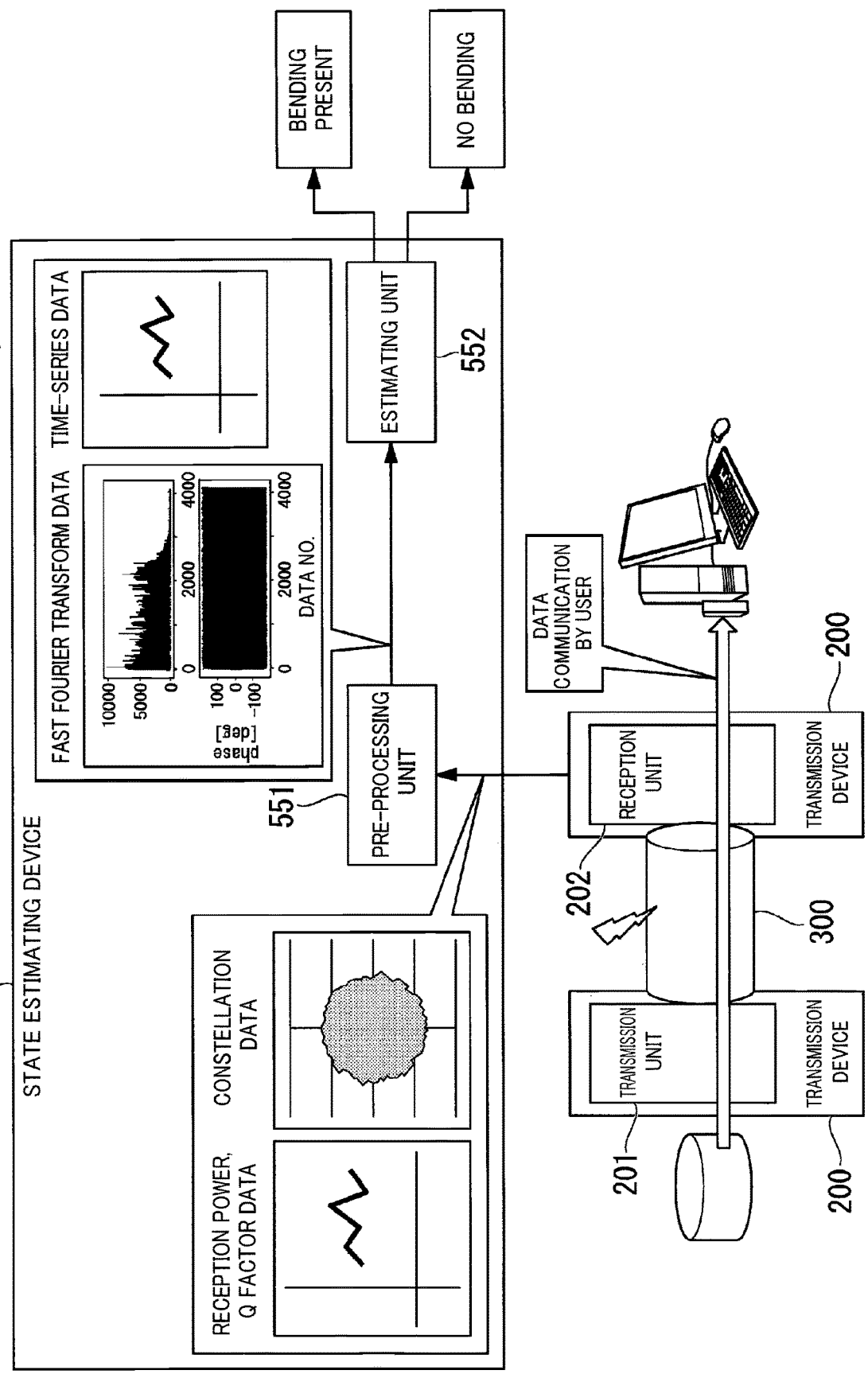
FIG. 5 is a block diagram illustrating a configuration of a communication system according to a fifth embodiment.

FIG. 5 is a block diagram illustrating a configuration of a communication system 105 according to a fifth embodiment of the present invention. In this Figure, parts that are the same as the communication system 101 according to the first embodiment illustrated in FIG. 1 are denoted by the same symbols, and description thereof will be omitted. The communication system 105 is provided with the transmission devices 200 and a state estimating device 550. The state estimating device 550 is provided with a pre-processing unit 551 and an estimating unit 552.

The pre-processing unit 551 acquires constellation data of the reception signals, and reception power and Q factor data, from the reception unit 202 of the transmission device 200 as signal reception data. The pre-processing unit 551 processes the constellation data into fast Fourier transform data representing the results of having performed fast Fourier transform, and processes the reception power and Q factor data into time-series data. The pre-processing unit 551 combines the time-series data of the reception power and Q factor data with the fast Fourier transform data of the constellation data, and outputs this to the estimating unit 552 as feature data. The estimating unit 552 estimates abnormal states of the transmission devices 200 and transmission path 300 on the basis of the data received from the pre-processing unit 551, and outputs estimation results.

As a result of estimation by the estimating unit 552, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Sixth Embodiment

Figure 6:
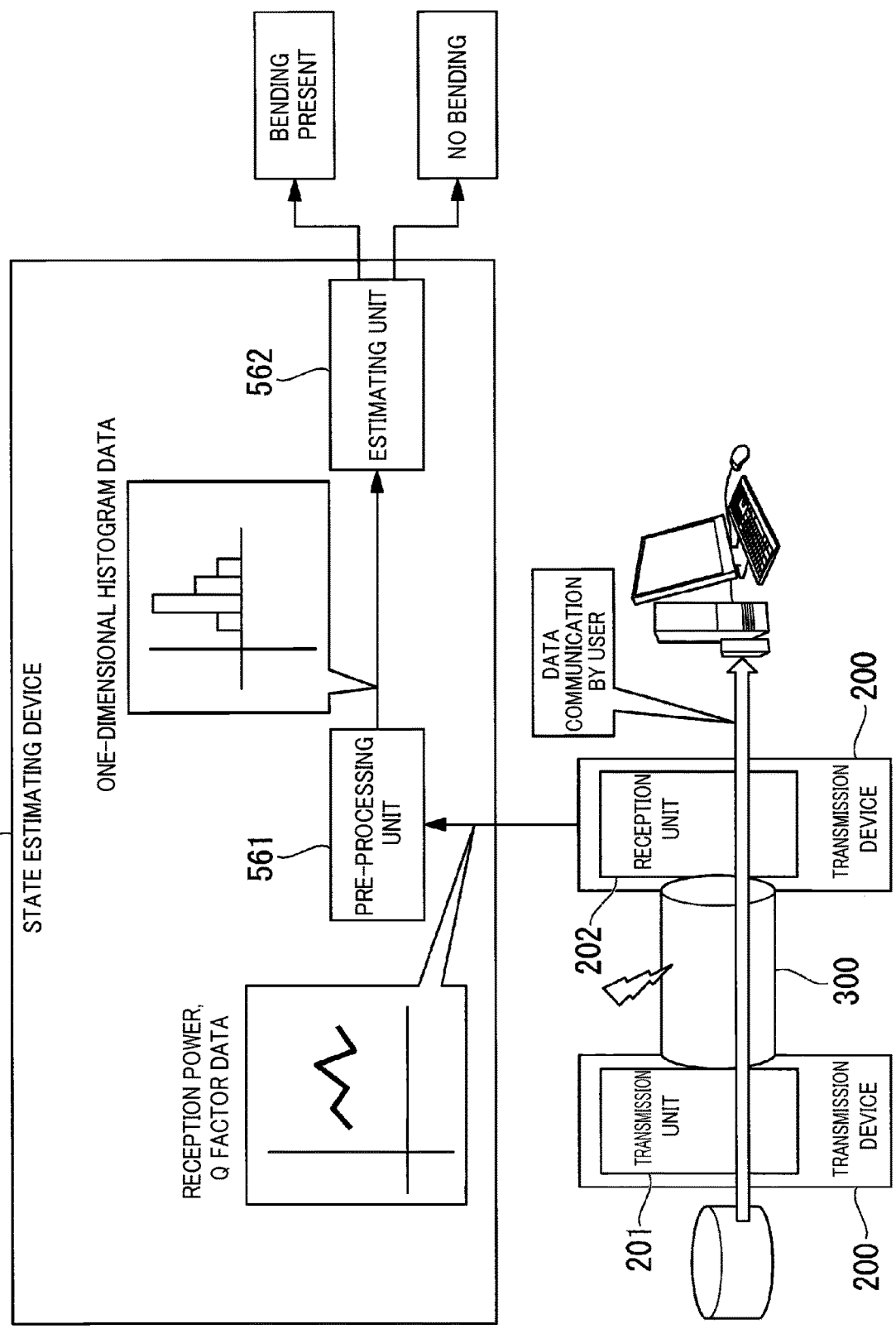
FIG. 6 is a block diagram illustrating a configuration of a communication system according to a sixth embodiment.

FIG. 6 is a block diagram illustrating a configuration of a communication system 106 according to a sixth embodiment of the present invention. In this Figure, parts that are the same as the communication system 101 according to the first embodiment illustrated in FIG. 1 are denoted by the same symbols, and description thereof will be omitted. The communication system 106 is provided with the transmission devices 200 and a state estimating device 560. The state estimating device 560 is provided with a pre-processing unit 561 and an estimating unit 562.

The pre-processing unit 561 acquires reception power or Q factor data of the reception signals from the reception unit 202 of the transmission device 200 as signal reception data. The pre-processing unit 561 processes the reception power or Q factor data that changes in time series into one-dimensional histogram data. The pre-processing unit 561 outputs the reception power or Q factor data converted into the one-dimensional histogram data to the estimating unit 562 as feature data. The estimating unit 562 estimates abnormal states of the transmission devices 200 and transmission path 300 on the basis of the feature data received from the pre-processing unit 561, and outputs estimation results.

As a result of estimation by the estimating unit 562, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Seventh Embodiment

Figure 7:
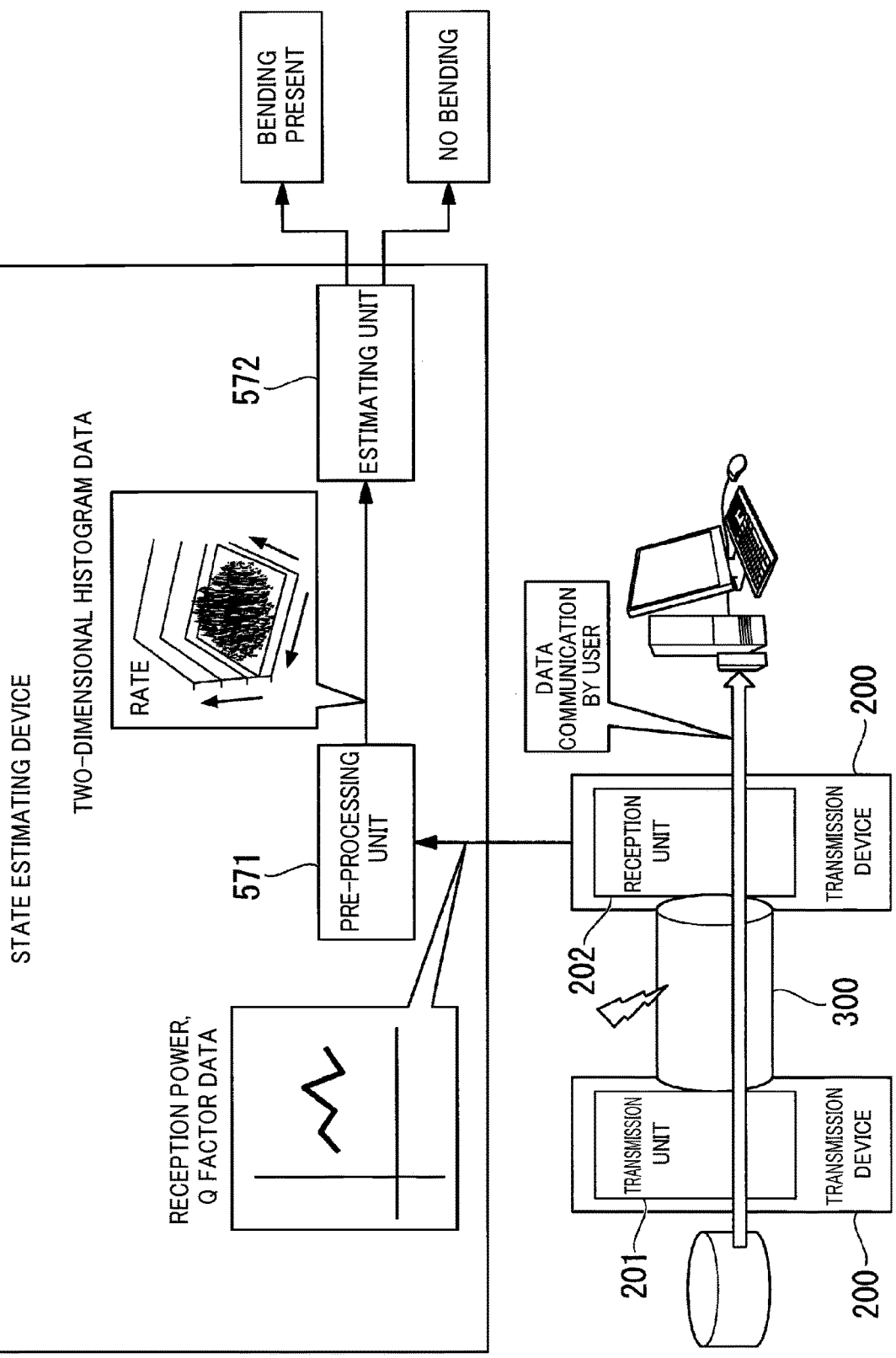
FIG. 7 is a block diagram illustrating a configuration of a communication system according to a seventh embodiment.

FIG. 7 is a block diagram illustrating a configuration of a communication system 107 according to a seventh embodiment of the present invention. In this Figure, parts that are the same as the communication system 101 according to the first embodiment illustrated in FIG. 1 are denoted by the same symbols, and description thereof will be omitted. The communication system 107 is provided with the transmission devices 200 and a state estimating device 570. The state estimating device 570 is provided with a pre-processing unit 571 and an estimating unit 572.

The pre-processing unit 571 acquires reception power or Q factor data from the reception unit 202 of the transmission device 200 as signal reception data. The pre-processing unit 571 plots the reception power or Q factor data on a two-dimensional plane, and processes this into two-dimensional histogram data representing rate of occurrence. The pre-processing unit 571 outputs the two-dimensional histogram data to the estimating unit 572 as feature data. The estimating unit 572 estimates abnormal states of the transmission devices 200 and transmission path 300 on the basis of the feature data received from the pre-processing unit 571, and outputs estimation results.

As a result of estimation by the estimating unit 572, abnormal states of the transmission path 300 such as bending of the optical fiber, tension, splicing point offset, temperature change, vibrations, water seepage, twisting, and so forth, and the degree thereof, abnormal states of the transmission module used for the transmission unit 201 of the transmission device 200, abnormal states of the reception module used for the reception unit 202 of the transmission device 200, and so forth, can be estimated.

Eighth Embodiment

Figure 8:
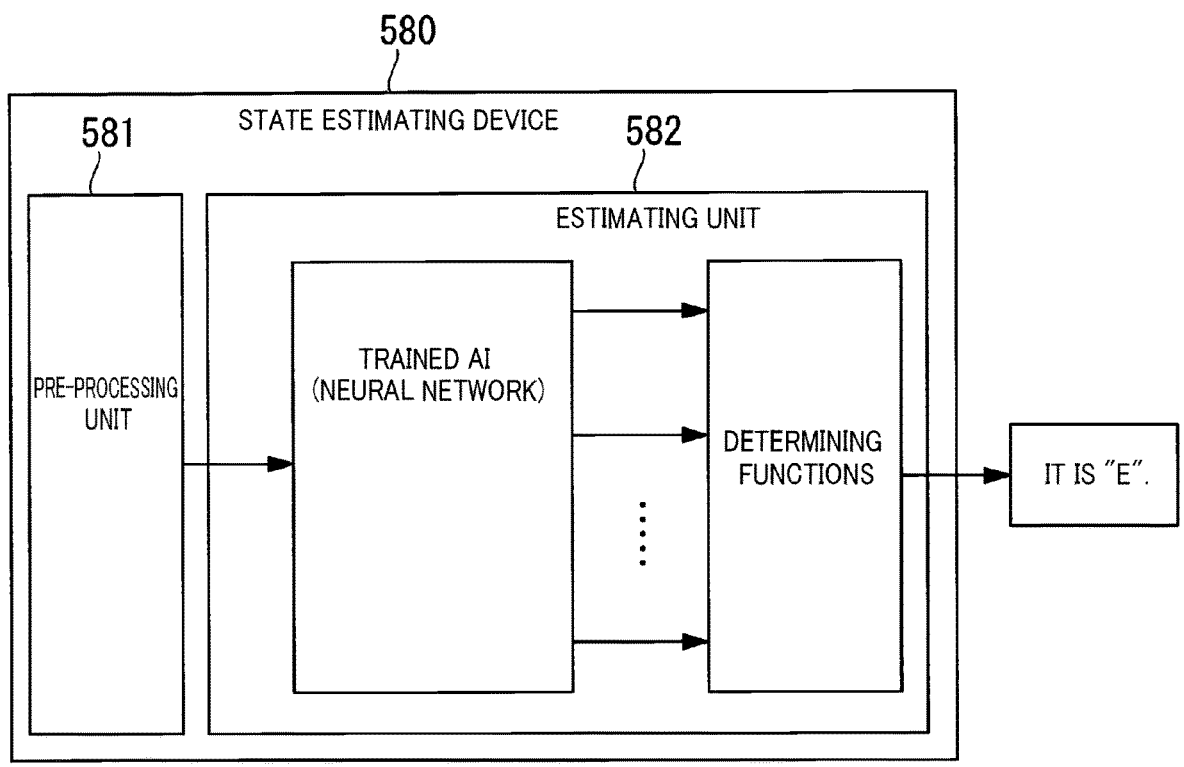
FIG. 8 is a diagram illustrating functions of an estimating unit according to an eighth embodiment.

FIG. 8 is a diagram illustrating functions of state estimation that a state estimating device 580 according to an eighth embodiment of the present invention has. The state estimating device 580 is provided with a pre-processing unit 581 and an estimating unit 582. The pre-processing unit 581 can be used as the pre-processing units 511, 521, 531, 541, 551, 561, and 571 in the above-described embodiments, and the estimating unit 582 can be used as the estimating units 512, 522, 532, 542, 552, 562, and 572 in the above-described embodiments.

The estimating unit 582 uses machine learning such as a neural network or the like. For example, AI (artificial intelligence) such as a neural network or the like is trained beforehand by feature data corresponding to states to be estimated, and the estimating unit 582 uses this trained AI (neural network). The trained AI uses feature data input from the pre-processing unit 581 to compute probability (likelihood) of a predetermined state. The predetermined state is used in final state judgment at the estimating unit 582, and is a state of a part included in any one of the state of the transmission path 300, abnormal state of the transmission module used for the transmission unit 201, and abnormal state of the reception module used for the reception unit 202. For example, the trained AI judges states such as the probability of bending of optical fiber being great, the probability of bending of optical fiber being moderate, the probability of bending of optical fiber being small, or the like. The trained AI also judges various states, such as the probability of bending of optical fiber being a predetermined level or higher, the probability of twisting of optical fiber being a predetermined level or higher, probability of an abnormality occurring at the transmission module, probability of an abnormality occurring at the reception module, and so forth, for example.

Thus, the estimating unit 582 can use feature data representing the physical state of reception signals through the trained AT to estimate the cause of failure (bending, tension, compression, fracture, vibrations, etc.) on the transmission path 300 and the degree thereof (radius of bending, strength of tension, amplitude of vibration and vibration cycle, etc.), and the probability of occurrence of abnormalities at each of the transmission module and reception module. The estimating unit 582 determines the state of the transmission path 300 and transmission devices 200 comprehensively from the computation results of these states, and outputs determination results. Determination functions of the estimating unit 582 can be realized by methods using AND/OR logic, and maximum value extraction computation.

Ninth Embodiment

Figure 9:
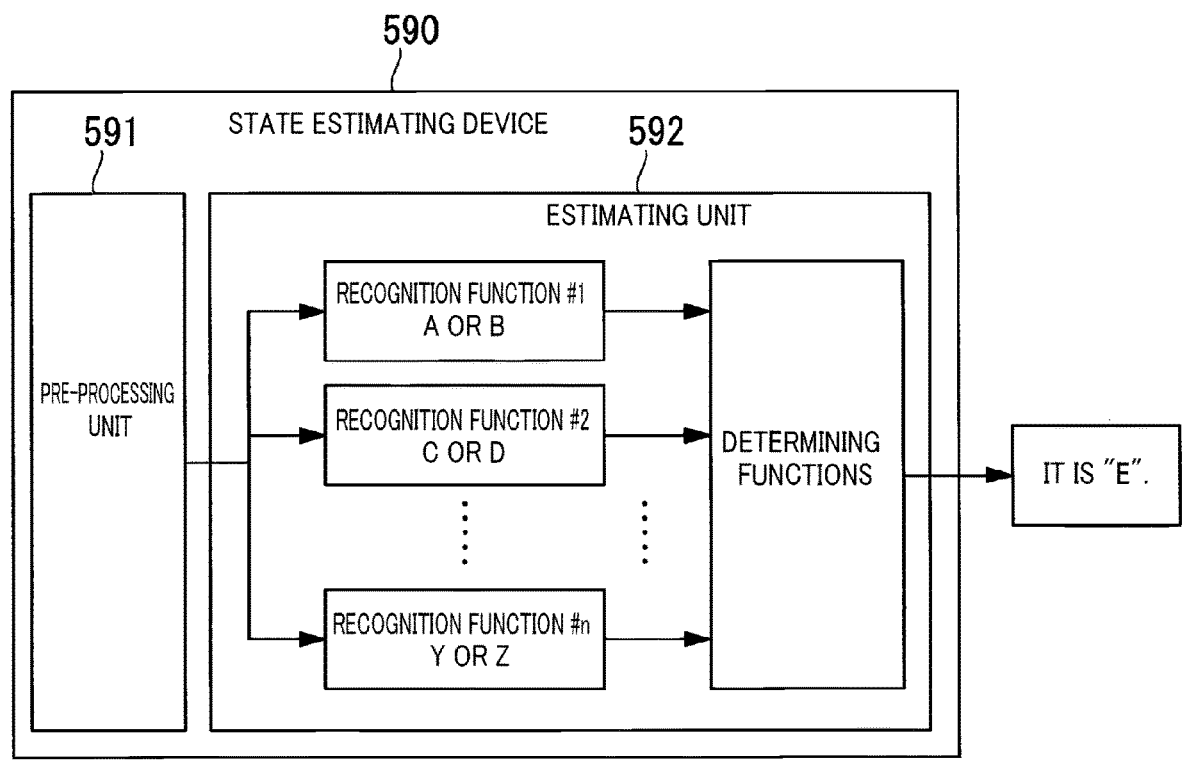
FIG. 9 is a diagram illustrating functions of an estimating unit according to a ninth embodiment.

FIG. 9 is a diagram illustrating functions of state estimation that a state estimating device 590 according to a ninth embodiment of the present invention has. The state estimating device 590 is provided with a pre-processing unit 591 and an estimating unit 592. The pre-processing unit 591 can be used as the pre-processing units 511, 521, 531, 541, 551, 561, and 571 in the above-described embodiments, and the estimating unit 592 can be used as the estimating units 512, 522, 532, 542, 552, 562, and 572 in the above-described embodiments.

The estimating unit 592 has recognition function #1 to recognition function #n, each of which recognizes two states. For example, recognition function #1 computes the probability of there being great bending of the optical fiber and the probability of no great bending, and recognition function #2 computes the probability of there being moderate bending of the optical fiber and the probability of no moderate bending. Also, for example, recognition function #1 computes the probability of there being bending of the optical fiber of a predetermined level or higher and the probability of no bending of a predetermined level or higher, recognition function #2 computes the probability of there being twisting of the optical fiber of a predetermined level or higher and the probability of there being none, recognition function #3 computes the probability of there being an abnormality at the transmission module and the probability of there being none, and recognition function #4 computes the probability of there being an abnormality at the reception module and the probability of there being none. The estimating unit 592 determines the state of the transmission path 300 and transmission devices 200 on the basis of the plurality of two states computed by each of the recognition function #1 to recognition function #n, and outputs determination results. The recognition function #1 to #n can be realized by methods using machine learning such as statistical estimation or classical rule-based AI, neural networks, and so forth.

Determination functions can be realized by methods using AND/OR logic, and maximum value extraction computation.

Tenth Embodiment

Figure 10:
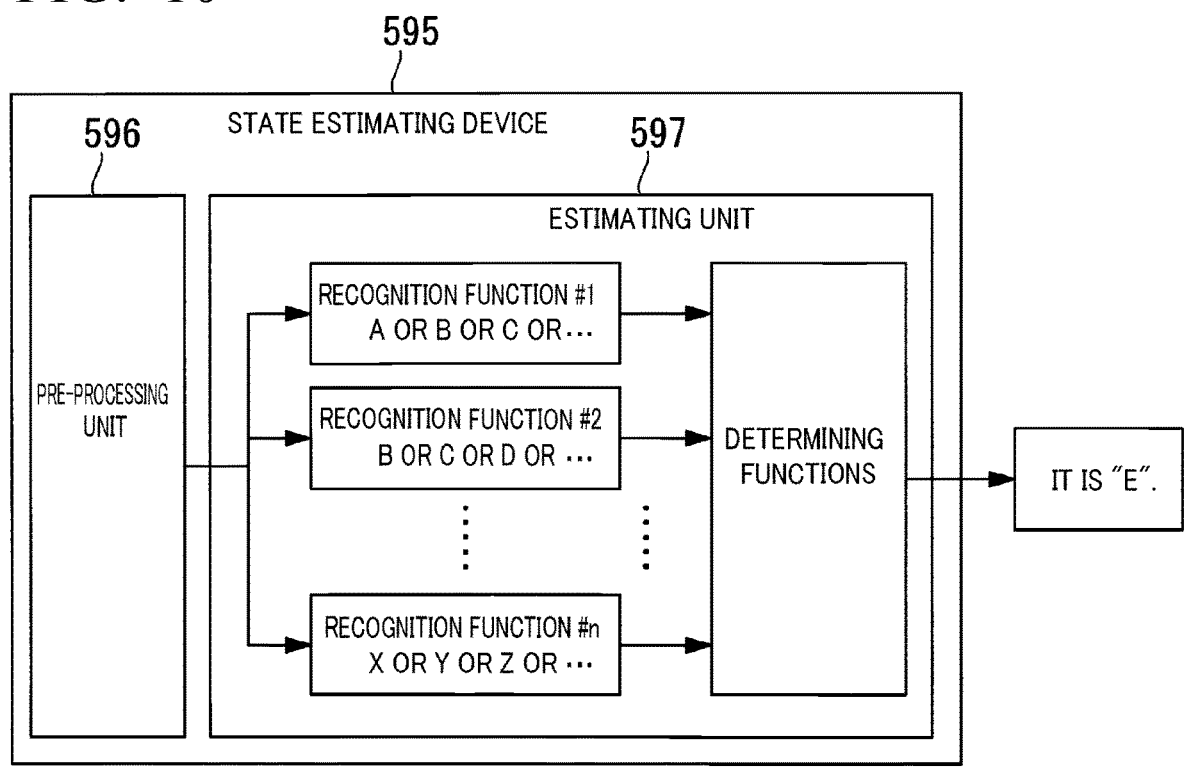
FIG. 10 is a diagram illustrating functions of an estimating unit according to a tenth embodiment.

FIG. 10 is a diagram illustrating functions of state estimation that a state estimating device 595 according to a tenth embodiment of the present invention has. The state estimating device 595 is provided with a pre-processing unit 596 and an estimating unit 597. The pre-processing unit 596 can be used as the pre-processing units 511, 521, 531, 541, 551, 561, and 571 in the above-described embodiments, and the estimating unit 597 can be used as the estimating units 512, 522, 532, 542, 552, 562, and 572 in the above-described embodiments.

The estimating unit 597 has recognition function #1 to recognition function #n, each of which recognizes two or more states. For example, recognition function #1 computes the probability of there being great bending of the optical fiber, the probability of there being little bending, and the probability of no bending, recognition function #2 computes the probability of there being great twisting of the optical fiber, the probability of there being little twisting, and the probability of no twisting. Also, for example, recognition function #3 computes the probability of there being an abnormality at the transmission module and the probability of no abnormality, and recognition function #4 computes the probability of there being an abnormality at the reception module and the probability of no abnormality. The estimating unit 597 determines the state of the transmission path 300 and transmission devices 200 on the basis of the plurality of two or more states computed by each of the recognition function #1 to recognition function #n, and outputs determination results. The recognition function #1 to #n can be realized by methods using machine learning such as statistical estimation or classical rule-based AI, neural networks, and so forth. Determination functions can be realized by methods using AND/OR logic, and maximum value extraction computation.

Eleventh Embodiment

Figure 11:
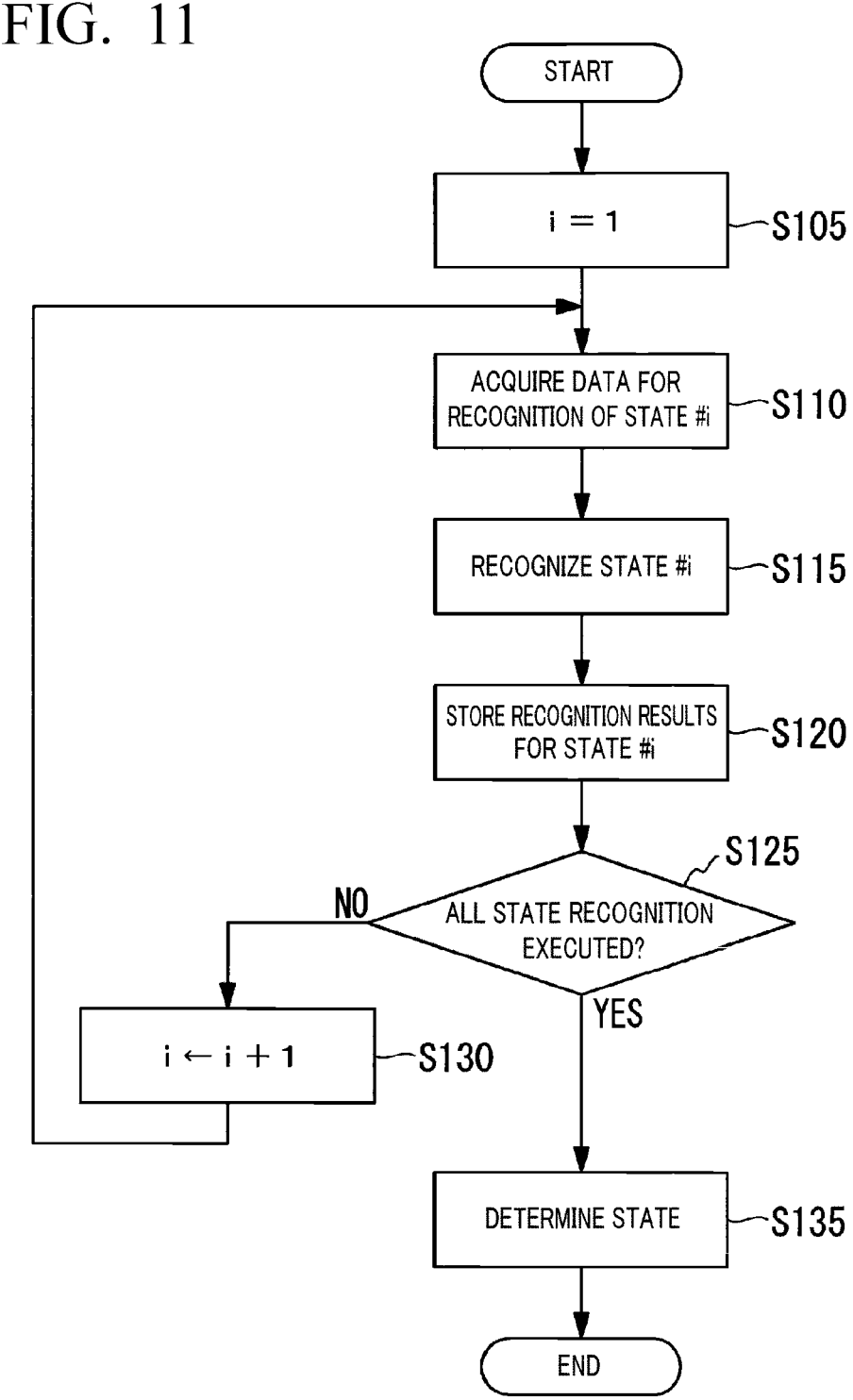
FIG. 11 is a flowchart illustrating operations of an estimating unit according to an eleventh embodiment.
Figure 12:
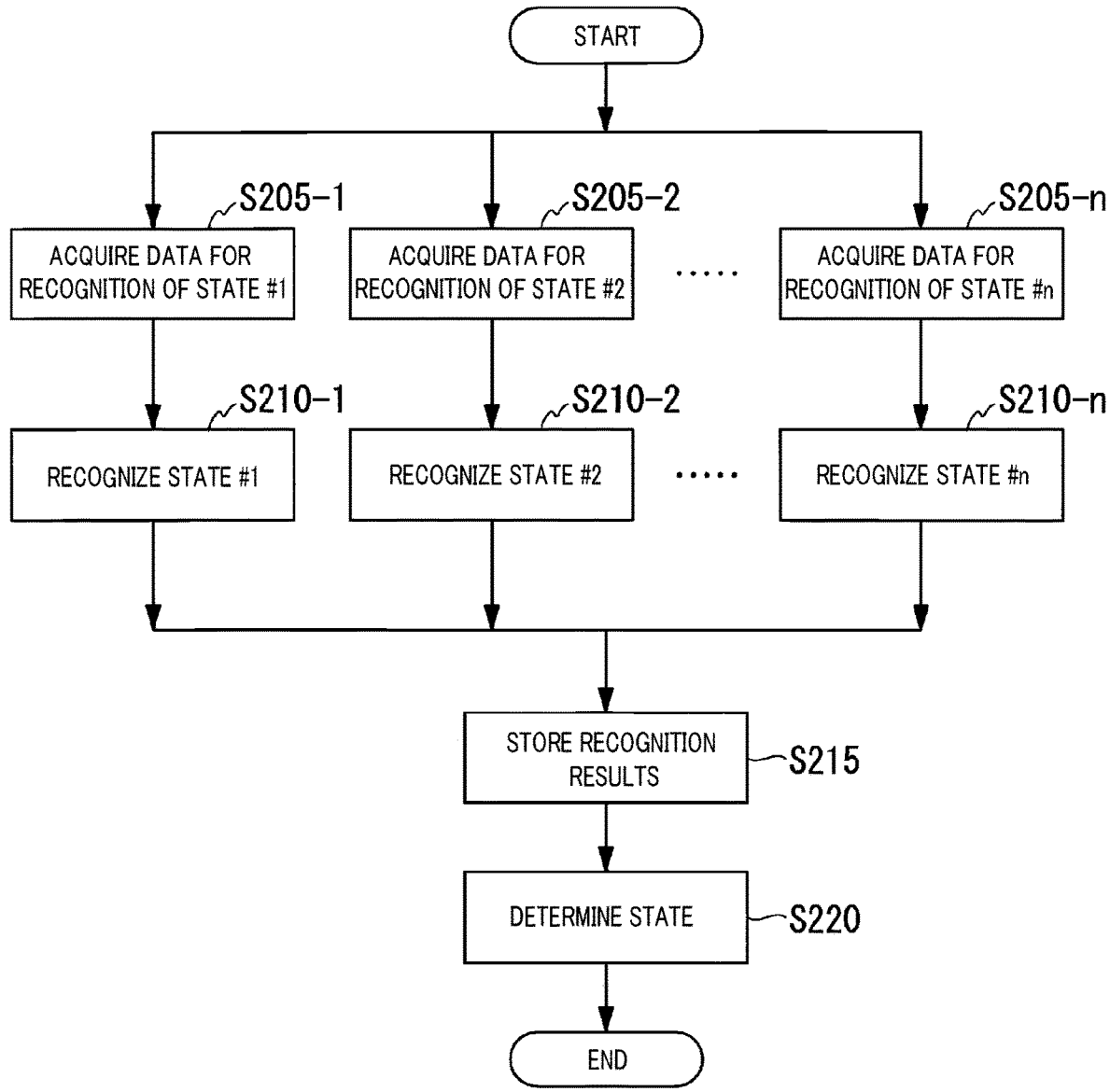
FIG. 12 is a flowchart illustrating other operations of the estimating unit according to the same embodiment.

FIG. 11 and FIG. 12 are flowcharts illustrating processing of an estimating unit that a state estimating device according to an eleventh embodiment of the present invention is provided with. The state estimating device 580 according to the eighth embodiment can be used as the state estimating device according to the present embodiment. Description will be made below by way of an example of a case where the trained AI used by the estimating unit 582 of the state estimating device 580 determines the states of n types of states #1 to #n.

FIG. 11 is a flowchart of a case of the trained AI judging each state sequentially.

First, the estimating unit 582 sets i to an initial value 1 (step S105). The estimating unit 582 acquires all or part of feature data received from the pre-processing unit 581 as feature data to be used for determining a state #i (step S110). The estimating unit 582 recognizes the state #i by the trained AI, using the acquired feature data as input (step S115). The estimating unit 582 stores the recognition results of the state #i (step S120). In a case of having determined that the value of i has not reached n and all state recognitions have not been executed (NO in step S125), the estimating unit 582 increments the value of i by 1, and repeats the processing from step S110 (step S130). In a case of having judged that the value of i has reached n and all state recognitions have been executed (YES in step S125), the estimating unit 582 executes determining functions using the recognition results of state #1 to state #n, and determines the states of the transmission path 300 and transmission devices 200 (step S135).

FIG. 12 is a flowchart of a case of the trained AI judging each state in parallel. First, the estimating unit 582 executes steps S205-1 and S210-1, steps S205-2 and S210-2, and so on through steps S205-n and S210-n, in parallel. The estimating unit 582 acquires all or part of feature data received from the pre-processing unit 581 as feature data to be used for determining the state #i (step S205-i), and recognizes the state #i by the trained AI, using the acquired feature data as input (step S210-i), for each of i=1 to n. The estimating unit 582 stores the recognition results of each state #1 to #n (Step S215). The estimating unit 582 executes determining functions using the recognition results of state #1 to state #n, and determines the states of the transmission path 300 and transmission devices 200 (step S220).

For example, the estimating unit 582 obtains the probability of the bending of the optical fiber being A mm by recognition of the state #1, the probability of the bending of the optical fiber being B mm by recognition of the state #2, and the probability of the bending of the optical fiber being X mm by recognition of the state #n. The estimating unit 582 determines that the bending of the optical fiber is Y mm by the determining functions, on the basis of these state recognition results.

In a case of performing the processing in FIG. 11, state determination can be performed without increasing the circuit scale of the estimating unit 582. Meanwhile, in a case of performing the processing in FIG. 12, the amount of time that the estimating unit 582 takes to perform state determination can be shortened.

Twelfth Embodiment

Figure 13:
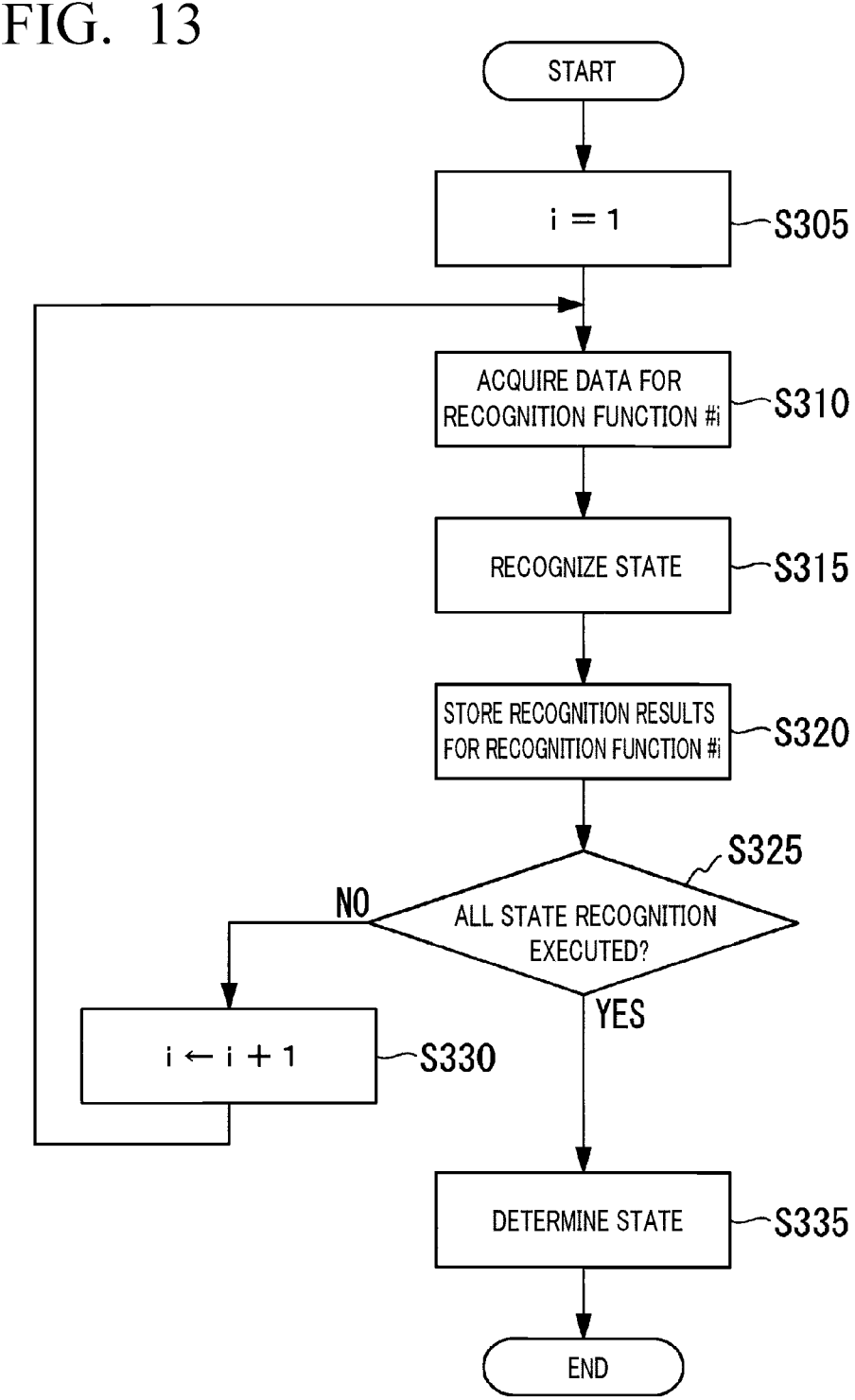
FIG. 13 is a flowchart illustrating operations of an estimating unit according to a twelfth embodiment.
Figure 14:
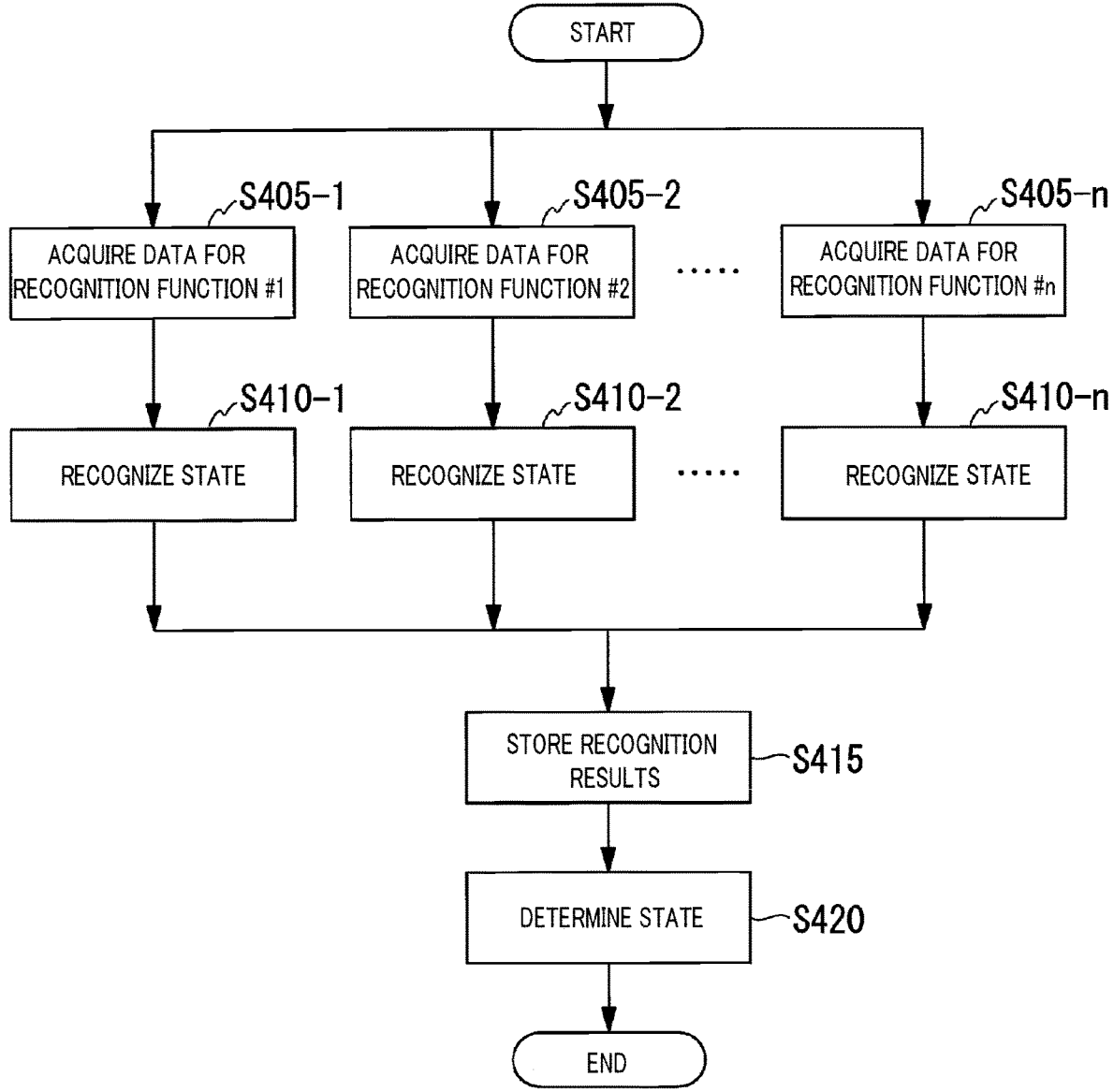
FIG. 14 is a flowchart illustrating other operations of the estimating unit according to the same embodiment.

FIG. 13 and FIG. 14 are flowcharts illustrating processing of an estimating unit that a state estimating device according to a twelfth embodiment of the present invention is provided with. The state estimating devices 590 and 595 according to the ninth and tenth embodiments can be used as the state estimating devices according to the present embodiment. Description will be made below by way of an example of a case where the estimating unit 597 of the state estimating device 595 has a recognition function #1 to recognition function #n.

FIG. 13 is a flowchart of a case of each recognition function operating sequentially. First, the estimating unit 597 sets i to an initial value 1 (step S305). The estimating unit 597 acquires all or part of feature data received from a pre-processing unit 596 as feature data to be used for determination of recognition function #i (step S310). The recognition function #i of the estimating unit 597 performs state recognition, using the acquired feature data as input (step S315). The estimating unit 597 stores the recognition results of the recognition function #i (Step S320). In a case of having determined that the value of i has not reached n and all recognition functions have not been executed (NO in step S325), the estimating unit 597 increments the value of i by 1, and repeats the processing from step S310 (S330). In a case of having judged that the value of i has reached n and all recognition functions have been executed (YES in step S325), the estimating unit 597 executes determining functions using the recognition results of recognition function #1 to recognition function #n, and determines the states of the transmission path 300 and transmission devices 200 (step S335).

FIG. 14 is a flowchart of a case of judging each recognition function in parallel. First, the estimating unit 597 executes steps S405-1 and S410-1, steps S405-2 and S410-2, and so on through steps S405-n and S410-n, in parallel. The recognition function #i of the estimating unit 597 acquires all or part of feature data received from the pre-processing unit 596 as feature data to be used for determining (step S405-i), and performs state recognition using the acquired feature data as input (step S410-i), for each of i=1 to n. The estimating unit 597 stores the recognition results of each recognition function #1 to recognition function #n (Step S415). The estimating unit 582 executes determining functions using the recognition results of recognition function #1 to recognition function #n, and determines the states of the transmission path 300 and transmission devices 200 (step S420).

For example, the estimating unit 597 obtains the probability of the bending of the optical fiber being none or A mm by recognition function #1, the probability of the bending of the optical fiber being none or B mm by recognition function #2, and the probability of the bending of the optical fiber being none or X mm by recognition function #n. The estimating unit 597 determines that the bending of the optical fiber is Y mm by the determining functions, on the basis of these state recognition results.

In a case of performing the processing in FIG. 13, state determination can be performed without increasing the circuit scale of the estimating units 592 and 597. Meanwhile, in a case of performing the processing in FIG. 14, the amount of time that the estimating units 592 and 597 takes to perform state determination can be shortened.

Note that instead of or in addition to power and Q factor in the above-described embodiments, one or more of BER (Bit Error Rate) value, OSNR (optical signal-to-noise ratio) value, ESNR (electrical signal-to-noise ratio) value, voltage amplitude value after converting light signals to electrical signals at a light receiver (Rx) that the reception unit 202 is provided with, tap coefficient of an Rx equalizer, and so forth, may be used. A tap coefficient relates to capabilities of correcting transmission path distortion at the Rx equalizer, and a value decided on the basis of properties of reception signals is used.

Thirteenth Embodiment

A transmission path has a plurality of physical paths in the communication system according to the present embodiment. Description will be made here by way of an example of a case where the transmission path is a multicore fiber having a plurality of cores (physical paths). Note that the transmission path may be a multifiber where a plurality of optical fibers (physical paths) have been bundled.

Figure 15:
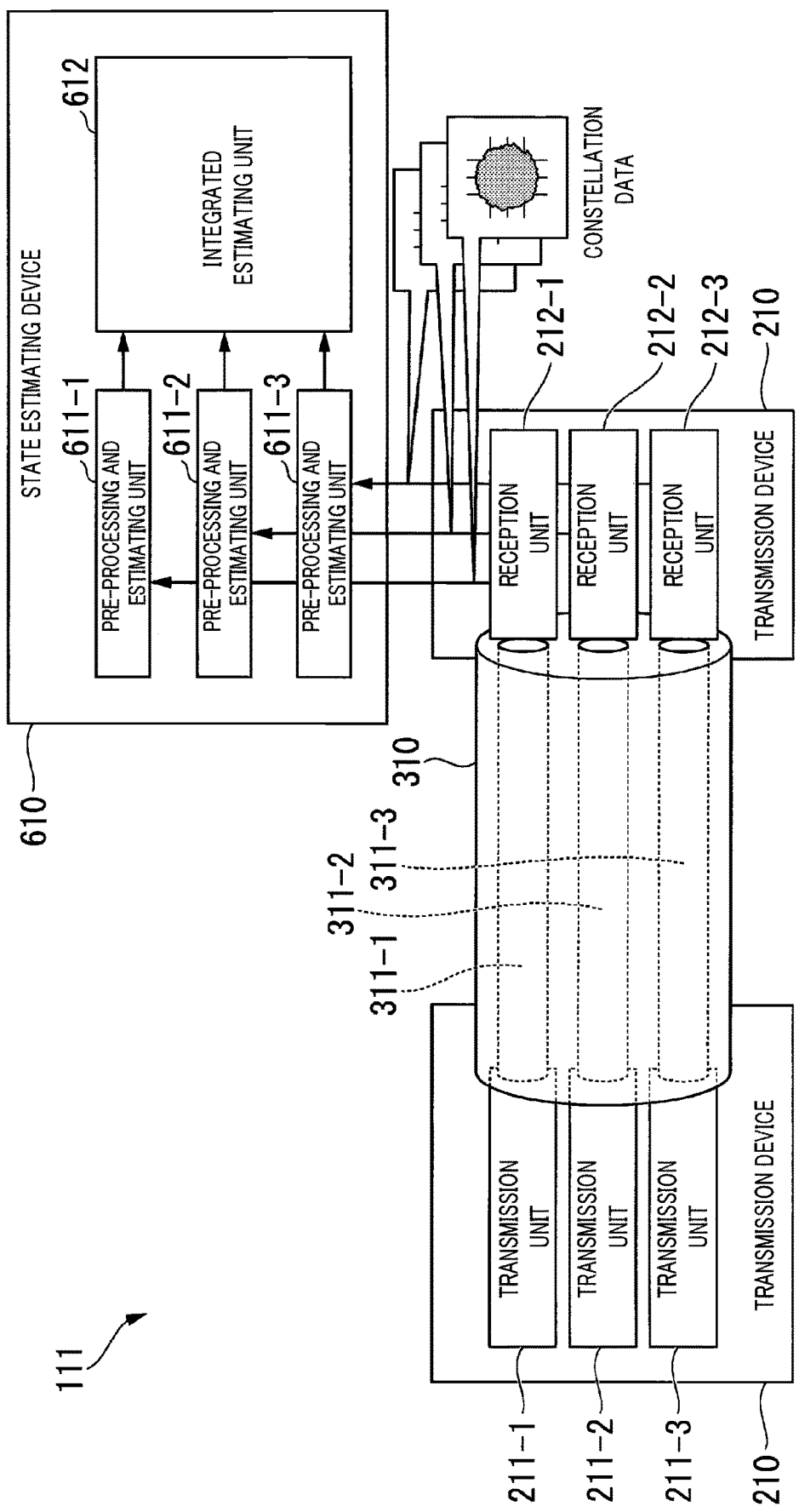
FIG. 15 is a block diagram illustrating a configuration of a communication system according to a thirteenth embodiment.

FIG. 15 is a block diagram illustrating a configuration of a communication system 111 according to a thirteenth embodiment. The communication system 111 is provided with transmission devices 210 and a state estimating device 610. The number of transmission devices 210 that the communication system 111 is provided with is optional. The transmission devices 210 are provided with one or more transmission units 211 and one or more reception units 212. The transmission devices 210 perform data communication via a multicore fiber 310. The multicore fiber 310 has cores 311-1 to 311-N (where N is an integer of 2 or larger). A case where N=3 is exemplified in this Figure.

Pairs of transmission unit 211 and reception unit 212 are connected by cores 311 of the multicore fiber 310. In the Figure, transmission units 211 and reception units 212 connected to cores 311-$n$ (where n is an integer of 1 or larger and N or smaller) will each be described as transmission units 211-$n$ and reception units 212-$n$. The transmission units 211-1 to 211-N may be transmission units 211 provided to one transmission device 210 as illustrated in the Figure, or part or all thereof may be transmission units 211 provided to different transmission devices 210. In the same way, the reception units 212-1 to 212-N may be reception units 212 provided to one transmission device 210 as illustrated in the Figure, or part or all thereof may be reception units 212 provided to different transmission devices 210.

The transmission units 211-$n$ (where n is an integer of 1 or larger and N or smaller) of the transmission device 210 at the transmitting side output light signals to the cores 311-$n$ of the multicore fiber 310. The transmission units 211-1 to 211-N each have a light source, and accordingly light signals generated using different light sources are output to each of the cores 311-1 to 311-N. The reception units 212-$n$ of the transmission device 210 at the receiving side receive light signals transmitted from another transmission device 210 via the cores 311-$n$ of the multicore fiber 310.

The state estimating device 610 has pre-processing and estimating units 611-1 to 611-K (where K is an integer of 2 or larger) and an integrated estimating unit 612. A case where K=N=3 is exemplified in this Figure. The pre-processing and estimating unit 611 is the set of pre-processing unit 511 and estimating unit 512 according to the first embodiment, the set of pre-processing unit 521 and estimating unit 522 according to the second embodiment, the set of pre-processing unit 531 and estimating unit 532 according to the third embodiment, the set of pre-processing unit 541 and estimating unit 542 according to the fourth embodiment, the set of pre-processing unit 551 and estimating unit 552 according to the fifth embodiment, the set of pre-processing unit 561 and estimating unit 562 according to the sixth embodiment, or the set of pre-processing unit 571 and estimating unit 572 according to the seventh embodiment.

The pre-processing and estimating units 611-$n$ (where n is an integer of 1 or larger and N or smaller) acquire data similar to the signal reception data acquired from the reception unit 202 in the first embodiment through the seventh embodiment, such as constellation data and so forth, from the reception units 212-$n$ of the transmission device 210, and generate feature data. The pre-processing and estimating units 611-$n$ estimate abnormal states of the cores 311-$n$ on the basis of the generated feature data, and output the estimation results to the integrated estimating unit 612. The integrated estimating unit 612 comprehensively judges the state estimation results of the multicore fiber 310 on the basis of the transmission/reception state of all cores 311-1 to 311-N, using estimation results output from each of the pre-processing and estimating units 611-1 to 611-N, and derives state estimation results for the multicore fiber 310. The integrated estimating unit 612 uses machine learning such as statistical estimation or classical rule-based AI, neural networks, and so forth, for example, to derive the state estimation results.

In the present embodiment, state estimation sensitivity of the transmission path can be improved by combining state estimations of each physical path making up the transmission path.

Fourteenth Embodiment

In the thirteenth embodiment, light signals generated using different light sources are transmitted over the plurality of physical paths that the transmission path has, and state estimation is performed. In the present embodiment, light signals generated using a single light source are transmitted over two or more or all of the plurality of physical paths that the transmission path has, and state estimation is performed. Primarily, differences as to the thirteenth embodiment will be described below.

Figure 16:
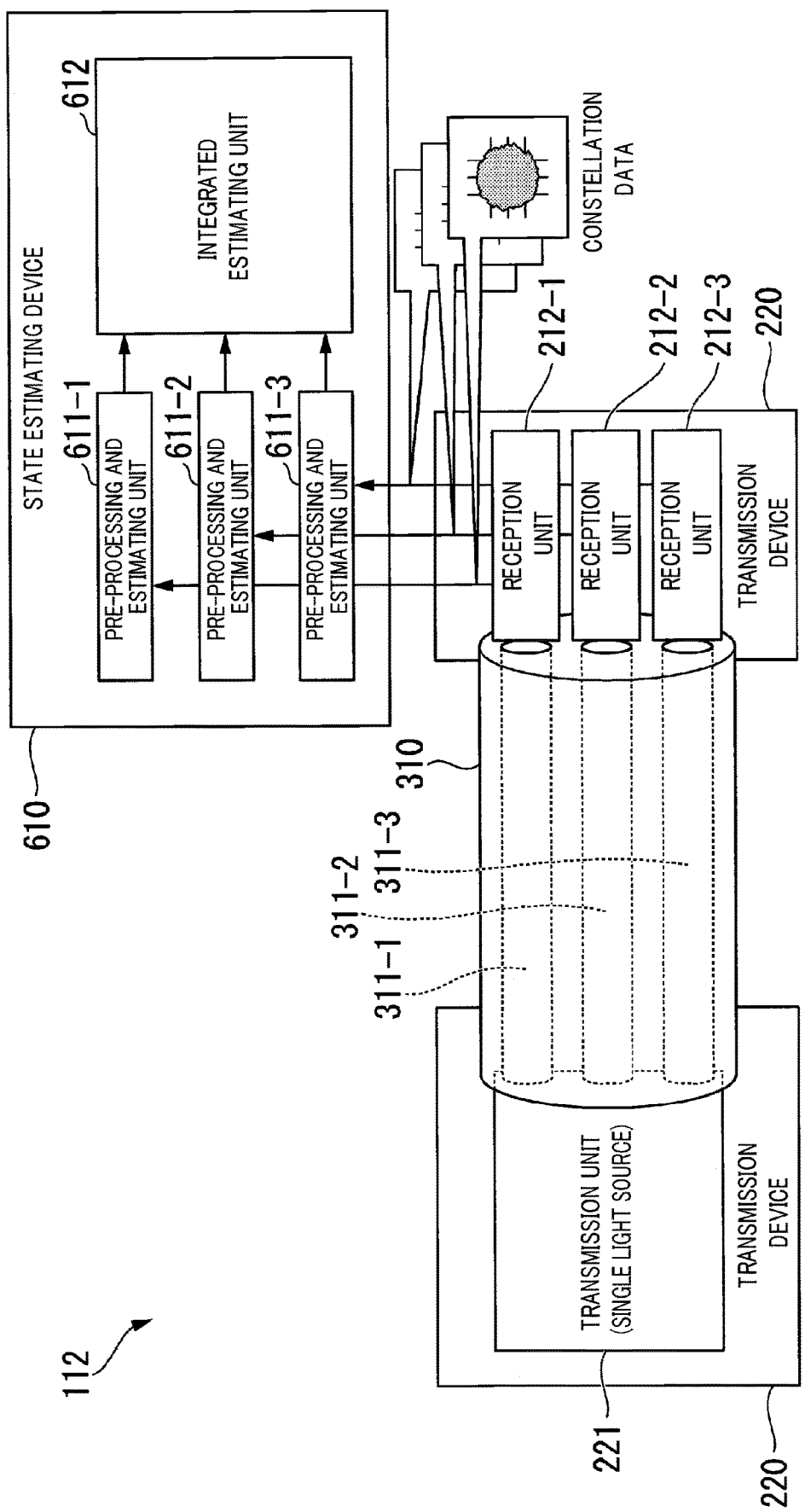
FIG. 16 is a block diagram illustrating a configuration of a communication system according to a fourteenth embodiment.

FIG. 16 is a block diagram illustrating a configuration of a communication system 112 according to a fourteenth embodiment. In this Figure, parts that are the same as those of the communication system 111 according to the thirteenth embodiment illustrated in FIG. 15 are denoted by the same symbols, and description thereof will be omitted. A point in which the communication system 112 illustrated in the Figure differs from the communication system 111 illustrated in FIG. 15 is that transmission devices 220 are provided instead of the transmission devices 210. The transmission devices 220 are provided with one or more transmission units 221 and one or more reception units 212. The cores 311-1 to 311-N (N=3 in the Figure) of the multicore fiber 310 are connected to one transmission unit 211, and the cores 311-$n$ (where n is an integer of 1 or larger and N or smaller) is connected to reception units 212-$n$. The reception units 212-1 to 212-N may be reception units 212 provided to one transmission device 220 as illustrated in the Figure, or part or all thereof may be reception units 212 provided to different transmission devices 220.

The transmission unit 221 of the transmission device 220 at the transmitting side outputs the same light signals using a single light source to the cores 311-1 to 311-N of the multicore fiber 310. The reception units 212-n of the transmission device 220 at the receiving side receive light signals that the transmission unit 221 of the transmission device 220 at the transmitting side has transmitted, via the cores 311-n of the multicore fiber 310. Using the same light signals makes the corelative relation closer between light signals after having been transmitted through the cores 311-1 to 311-N, and accordingly the state estimation sensitivity of the transmission path can be improved.

Fifteenth Embodiment

In the present embodiment, wavelength-multiplexed signals are transmitted over the plurality of physical paths that the transmission path has, and state estimation is performed.

Figure 17:
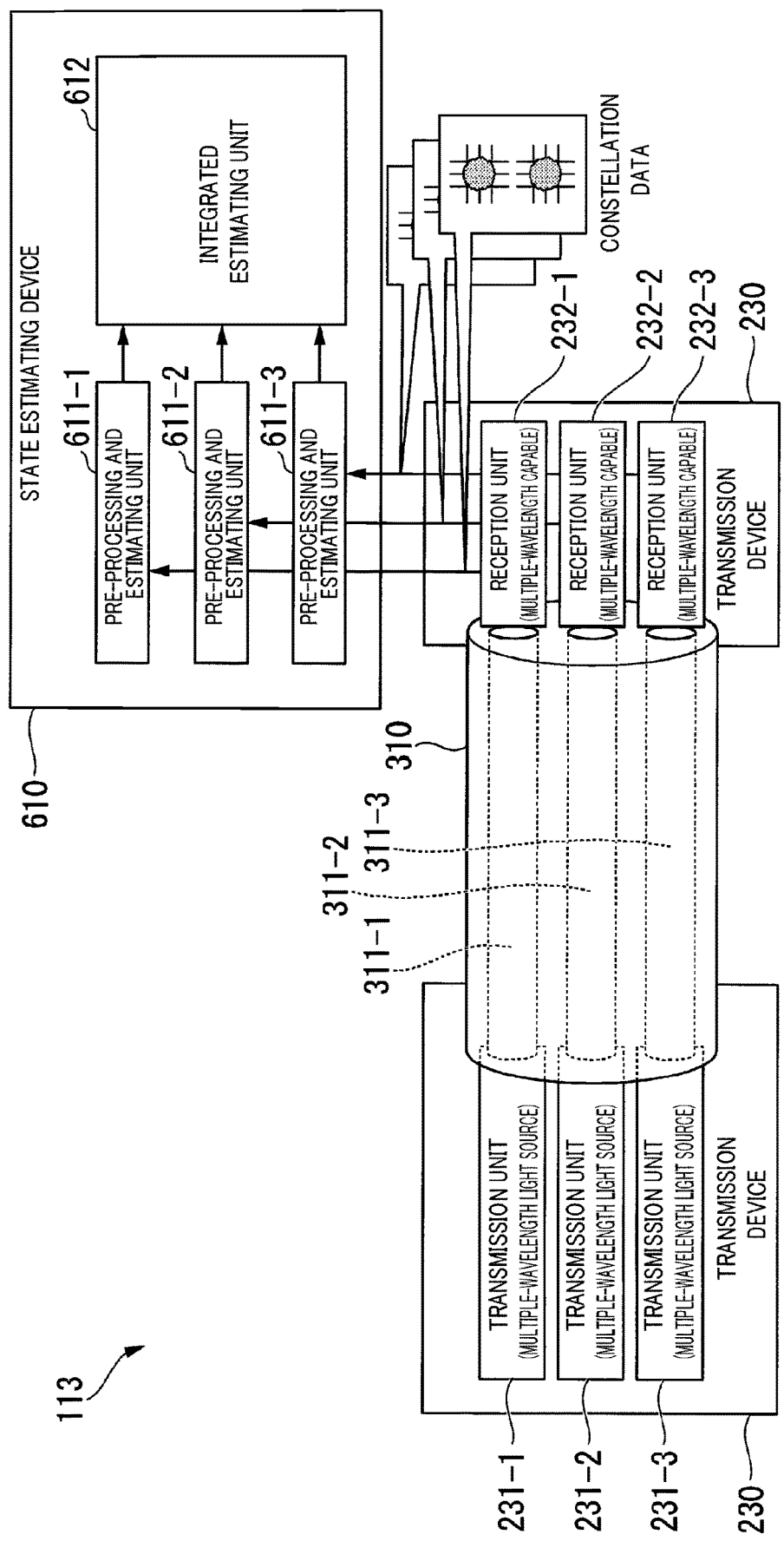
FIG. 17 is a block diagram illustrating a configuration of a communication system according to a fifteenth embodiment.

FIG. 17 is a block diagram illustrating a configuration of a communication system 113 according to the present embodiment. In this Figure, parts that are the same as those of the communication system 111 according to the thirteenth embodiment illustrated in FIG. 15 are denoted by the same symbols, and description thereof will be omitted. A point in which the communication system 113 illustrated in the Figure differs from the communication system 111 illustrated in FIG. 15 is that transmission devices 230 are provided instead of the transmission devices 210.

The transmission devices 230 are provided with one or more transmission units 231 and one or more reception units 232. The transmission units 231 have multiple-wavelength light sources, and transmit wavelength-multiplexed light signals to the cores 311 of the multicore fiber 310. The reception units 232 receive the wavelength-multiplexed light signals from the cores 311 of the multicore fiber 310.

Pairs of transmission unit 231 and reception unit 232 are connected by cores 311 of the multicore fiber 310. In the Figure, transmission units 231 and reception units 232 connected to cores 311-n (where n is an integer of 1 or larger and N or smaller, N=3 in the Figure) will each be described as transmission units 231-n and reception units 232-n. The transmission units 231-1 to 231-N may be transmission units 231 provided to one transmission device 230 as illustrated in the Figure, or part or all thereof may be transmission units 231 provided to different transmission devices 230. In the same way, the reception units 232-1 to 232-N may be reception units 232 provided to one transmission device 230 as illustrated in the Figure, or part or all thereof may be reception units 232 provided to different transmission devices 230.

The pre-processing and estimating units 611-n (where n is an integer of 1 or larger and N or smaller) of the state estimating device 610 acquire data similar to the signal reception data acquired from the reception unit 202 in the first embodiment through the seventh embodiment, such as constellation data, from the reception units 232-n of the transmission device 230, for each wavelength, and generate feature data. The pre-processing and estimating units 611-n estimate abnormal states of the cores 311-n on the basis of the feature data, for each wavelength, and output the estimation results. The integrated estimating unit 612 comprehensively judges the state estimation results of the multicore fiber 310 on the basis of the transmission/reception state of all cores 311-1 to 311-N, using estimation results output from each of the pre-processing and estimating units 611-1 to 611-N for each wavelength, and derives state estimation results for the multicore fiber 310.

In this way, the present embodiment differs from the thirteenth embodiment with regard to the point that the transmission unit 231 and reception unit 232 both are arranged to handle multiple-wavelength light sources. Each core 311 transmits light signals where a plurality of different wavelengths have been multiplexed. If wavelengths are different, physical effects received during transmission differ even for the same core 311, and accordingly difference in signals is manifested upon reception, and further, differences also occur in estimation results at the estimating unit. Since how long or short the wavelengths are, and the degree of physical effects received from the fiber (core), are known, the state estimation sensitivity of the transmission path can be improved by evaluating the difference in estimation results by the estimating unit. Note that while description has been made above by way of an example regarding a case where the transmission path is a multicore fiber, similar advantages can be anticipated for a single-core fiber as well.

Sixteenth Embodiment

The communication system according to the present embodiment uses a transmission path where a multicore fiber and a multimode fiber have been bundled. Primarily, differences as to the thirteenth embodiment will be described below.

Figure 18:
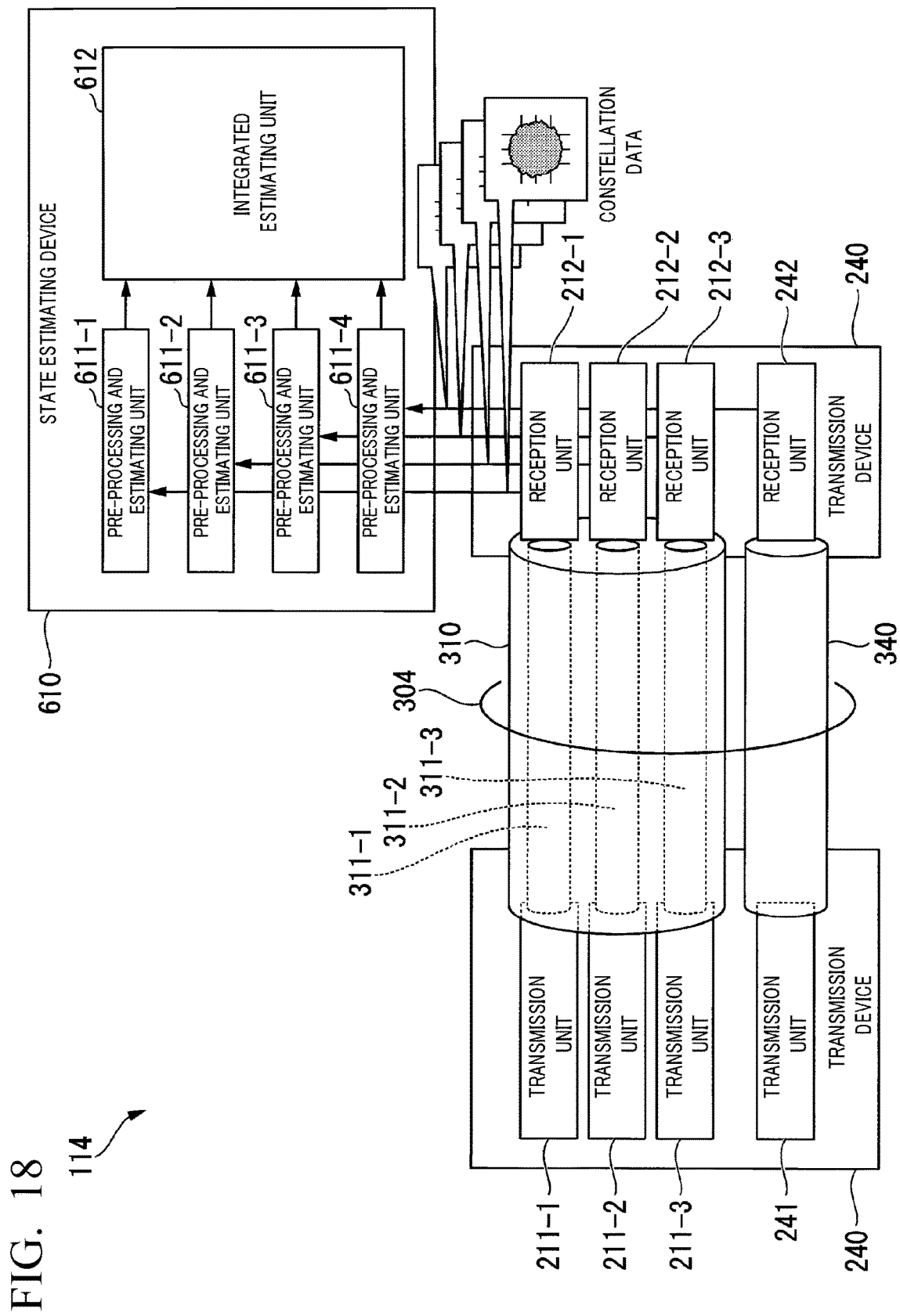
FIG. 18 is a block diagram illustrating a configuration of a communication system according to a sixteenth embodiment.

FIG. 18 is a block diagram illustrating a configuration of a communication system 114 according to the present embodiment. In this Figure, parts that are the same as those of the communication system 111 according to the thirteenth embodiment illustrated in FIG. 15 are denoted by the same symbols, and description thereof will be omitted. The communication system 114 is provided with transmission devices 240 and the state estimating device 610. The transmission devices 240 perform data communication via a transmission path 304.

The transmission path 304 is an arrangement where the multicore fiber 310 and a multimode fiber 340 have been bundled by the same sheath and integrated. A multifiber may be used instead of the multicore fiber 310. The number of transmission devices 240 that the communication system 114 is provided with is optional.

The transmission devices 240 are provided with at least one or more of the transmission unit 211, a transmission unit 241, the reception unit 212, and a reception unit 242. Pairs of transmission unit 211 and reception unit 212 are connected by cores 311 of the multicore fiber 310. The transmission units 211 and reception units 212 connected to cores 311-n (where n is an integer of 1 or larger and N or smaller, N=3 in the Figure) will each be described as transmission units 211-n and reception units 212-n. A pair of transmission unit 241 and reception unit 242 is connected by the multimode fiber 340 as well. The transmission units 211-1 to 211-N and transmission unit 241 may be provided to one transmission device 240 as illustrated in the Figure, or part or all thereof may be provided to different transmission devices 240. In the same way, the reception units 212-1 to 212-N and reception unit 242 may be provided to one transmission device 240 as illustrated in the Figure, or part or all thereof may be provided to different transmission devices 240.

The transmission units 211-n (where n is an integer of 1 or larger and N or smaller) of the transmission device 240 at the transmitting side output light signals to the cores 311-n of the multicore fiber 310. The reception units 212-n of the transmission device 240 at the receiving side receive the light signals transmitted by another transmission device 210 via the cores 311-n of the multicore fiber 310. Also, the transmission unit 241 of the transmission device 240 at the transmitting side outputs multimode light signals to the multimode fiber 340. The reception unit 242 of the transmission device 240 at the receiving side receives the multimode light signals transmitted by another transmission device 240 via the multimode fiber 340.

The pre-processing and estimating units 611-n (where n is an integer of 1 or larger and N or smaller) of the state estimating device 610 acquire data similar to the signal reception data acquired from the reception unit 202 in the first embodiment through the seventh embodiment, such as constellation data, from the reception units 212-n of the transmission device 240, the pre-processing and estimating unit 611-(N+1) acquires the same from the reception unit 242 of the transmission device 240, and generate feature data. The pre-processing and estimating units 611-n estimate abnormal states of the cores 311-n on the basis of the generated feature data, and output the estimation results. The pre-processing and estimating unit 611-(N+1) estimates abnormal states of the multimode fiber 340 on the basis of the generated feature data, and outputs the estimation results. The integrated estimating unit 612 comprehensively judges the estimation results output from each of the pre-processing and estimating units 611-1 to 611-(N+1), and derives state estimation results for the transmission path 304.

The physical effects that light signals being transmitted receive from the cores 311 of the multicore fiber 310, and the physical effects received from the multimode fiber 340, are greatly different. Accordingly, difference in signals is manifested upon reception, and further, differences also occur in results at the estimating units that the pre-processing and estimating units 611 have. Since the difference in the physical effects received from multicore fiber and multimode fiber is known, the state estimation sensitivity of the transmission path 304 can be improved by evaluating the difference in estimation results by the estimating units of the respective pre-processing and estimating units 611-1 to 611-(N+1) at the integrated estimating unit 612. In a case of multimode fiber in particular, transmission properties are different if the mode is different, even for light signals of the same wavelength (e.g., physical effects are different), and accordingly a variety of variations can be used in a method to improve state estimation sensitivity. Examples thereof will be illustrated below in seventeenth through nineteenth embodiments.

Seventeenth Embodiment

A communication system according to the present embodiment uses a multimode fiber and a mode multiplexer/demultiplexer as a transmission path having a plurality of physical paths.

Figure 19:
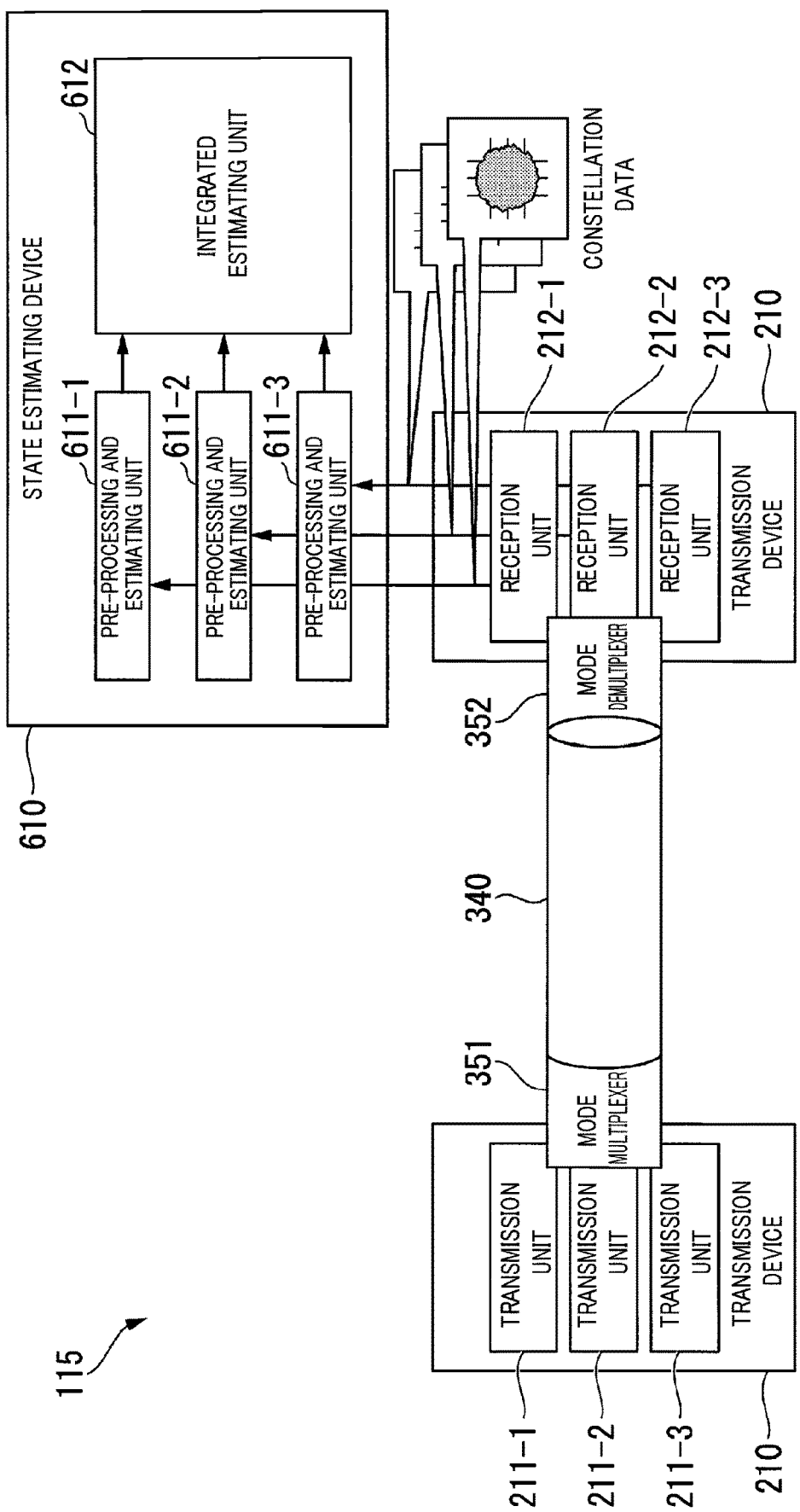
FIG. 19 is a block diagram illustrating a configuration of a communication system according to a seventeenth embodiment.

FIG. 19 is a block diagram illustrating a configuration of a communication system 115 according to the present embodiment. In this Figure, parts that are the same as the communication system 111 according to the thirteenth embodiment illustrated in FIG. 15 are denoted by the same symbols, and description thereof will be omitted. In the communication system 115, a mode multiplexer 351, the multimode fiber 340, and a mode demultiplexer 352 are used as the transmission path.

The mode multiplexer 351 is connected to the transmission units 211-1 to 211-N and the multimode fiber 340. In the Figure, N=3. The transmission units 211-1 to 211-N may be transmission units 211 provided to one transmission device 210 as illustrated in the Figure, or part or all thereof may be transmission units 211 provided to different transmission devices 210. Also, the mode multiplexer 351 may be provided within the transmission device 210.

The mode demultiplexer 352 is connected to the reception units 212-1 to 212-N and the multimode fiber 340. The reception units 212-1 to 212-N may be reception units 212 provided to one transmission device 210 as illustrated in the Figure, or part or all thereof may be reception units 212 provided to different transmission devices 210. Also, the mode demultiplexer 352 may be provided within the transmission device 210.

The transmission units 211-1 to 211-N of the transmission device 210 at the transmitting side each generate light signals, and the mode multiplexer 351 performs mode multiplexing of these generated light signals and outputs to the multimode fiber 340. The mode demultiplexer 352 receives multimode light signals transmitted over the multimode fiber 340 and demultiplexes by mode, and outputs the light signals transmitted by the transmission units 211-n to the reception units 212-n of the transmission device 210 at the receiving side. The pre-processing and estimating units 611-n (where n is an integer of 1 or larger and N or smaller) of the state estimating device 610 acquire signal reception data such as constellation data from the reception units 212-n of the transmission device 210, generate feature data, and output estimation results of abnormal states on the transmission path, estimated on the basis of the feature data, to the integrated estimating unit 612. The integrated estimating unit 612 comprehensively judges the estimation results for each mode output from each of the pre-processing and estimating units 611-1 to 611-N, and derives state estimation results for the transmission path.

In the present embodiment, state estimation sensitivity is improved by connecting a plurality of transmission units 211 and a plurality of reception units 212 to the multimode fiber 340 via the mode multiplexer 351 and mode demultiplexer 352.

Eighteenth Embodiment

In the sixteenth embodiment, light signals generated using different light sources are transmitted to each of each core in a multicore fiber and to a multimode fiber, and state estimation is performed. In the present embodiment, light signals generated using the same light source are transmitted to each core in a multicore fiber and to a multimode fiber, and state estimation is performed. Primarily, differences as to the sixteenth embodiment will be described below.

Figure 20:
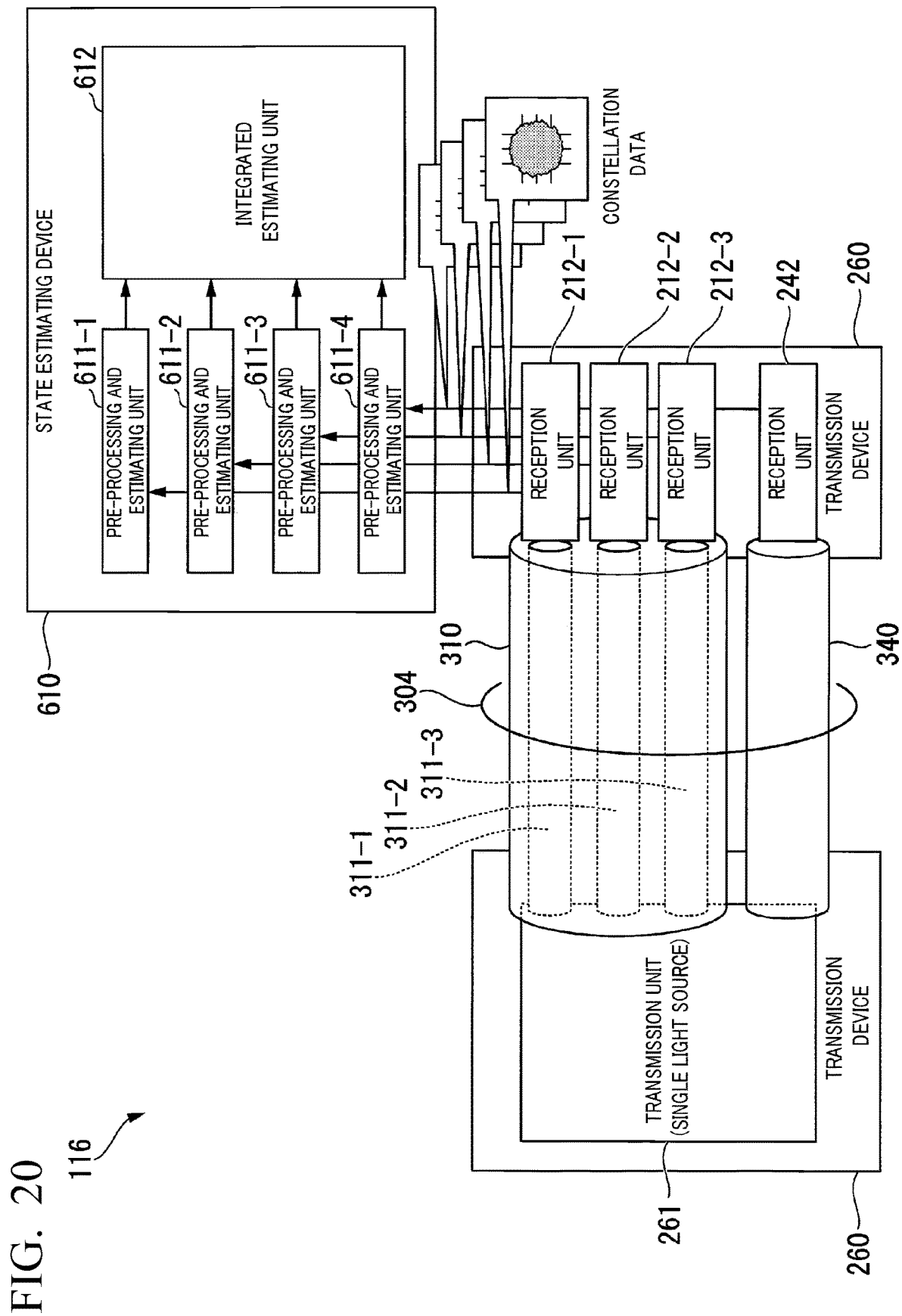
FIG. 20 is a block diagram illustrating a configuration of a communication system according to an eighteenth embodiment.

FIG. 20 is a block diagram illustrating a configuration of a communication system 116 according to the present embodiment. In this Figure, parts that are the same as the communication system 114 according to the sixteenth embodiment illustrated in FIG. 18 are denoted by the same symbols, and description thereof will be omitted. The communication system 116 illustrated in the Figure differs from the communication system 114 illustrated in FIG. 18 with the regard to the point of being provided with transmission devices 260 instead of the transmission devices 240.

The transmission devices 260 are provided with at least one or more of a transmission unit 261, the reception unit 212, and the reception unit 242. Cores 311-1 to 311-N (N=3 in the Figure) of the multicore fiber 310 and the multimode fiber 340 are connected to one transmission unit 261. Also, the cores 311-n (where n is an integer of 1 or larger and N or smaller) are connected to reception units 212-n, and the multimode fiber 340 is connected to the reception unit 242. The reception units 212-1 to 212-N and reception unit 242 may be provided to one transmission device 260 as illustrated in the Figure, or part or all thereof may be provided to different transmission devices 260.

The transmission unit 261 of the transmission device 260 at the transmitting side outputs the same light signals using a single light source to the cores 311-1 to 311-N of the multicore fiber 310 and multimode fiber 340. The reception units 212-n of the transmission device 260 at the receiving side receive these light signals transmitted by the transmission unit 261 via the cores 311-n of the multicore fiber 310, and the reception unit 242 receives the same via the multimode fiber 340.

As described above, there is one transmission unit 261 (single light source) for all cores 311 of the multicore fiber 310 and for the multimode fiber 340 in the present embodiment. The example in the present embodiment is a combination of the method of improving state estimation sensitivity of the transmission path illustrated in the sixteenth embodiment illustrated in FIG. 18 with the fourteenth embodiment illustrated in FIG. 16.

Nineteenth Embodiment

In the sixteenth embodiment, light signals of one wavelength are transmitted to each core of the multicore fiber and to the multimode fiber, and state estimation is performed. In the present embodiment, wavelength-multiplexed signals are transmitted to each core of the multicore fiber and to the multimode fiber, and state estimation is performed. Primarily, differences as to the sixteenth embodiment will be described below.

Figure 21:
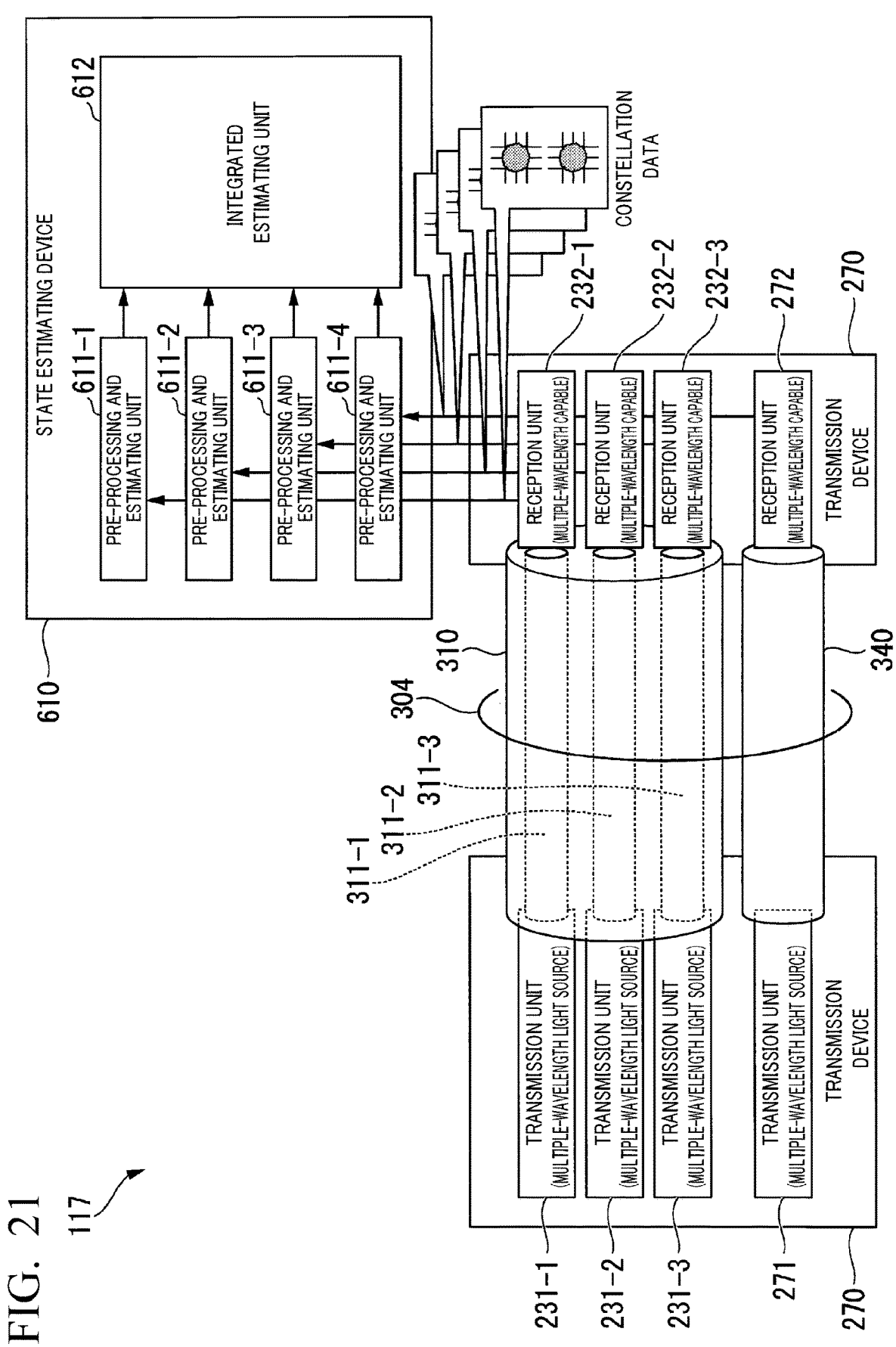
FIG. 21 is a block diagram illustrating a configuration of a communication system according to a nineteenth embodiment.

FIG. 21 is a block diagram illustrating a configuration of a communication system 117 according to the present embodiment. In this Figure, parts that are the same as the communication system 113 according to the fifteenth embodiment illustrated in FIG. 17 and the communication system 114 according to the sixteenth embodiment illustrated in FIG. 18 are denoted by the same symbols, and description thereof will be omitted. The communication system 117 illustrated in the Figure differs from the communication system 114 illustrated in FIG. 18 with the regard to the point of being provided with transmission devices 270 instead of the transmission devices 240.

The transmission devices 270 are provided with at least one or more of the transmission unit 231, a transmission unit 271, the reception unit 232, and a reception unit 272. The transmission unit 231 has a multiple-wavelength light source, and transmits wavelength-multiplexed light signals to the cores 311 of the multicore fiber 310. The transmission unit 271 has a multiple-wavelength light source, and transmits wavelength-multiplexed multimode light signals to the multimode fiber 340. The reception unit 232 is arranged to handle wavelength multiplexing, and receives wavelength-multiplexed light signals from the cores 311 of the multicore fiber 310. The reception unit 272 receives wavelength-multiplexed multimode light signals from the multimode fiber 340.

Pairs of transmission units 231-n and reception units 232-n are connected by cores 311-n (where n is an integer of 1 or larger and N or smaller, N=3 in the Figure) of the multicore fiber 310. A pair of transmission unit 271 and reception unit 272 is connected by the multimode fiber 340 as well. The transmission units 231-1 to 231-N and transmission unit 271 may be provided to one transmission device 270 as illustrated in the Figure, or part or all thereof may be provided to different transmission devices 270. In the same way, the reception units 232-1 to 232-N and reception unit 272 may be provided to one transmission device 270 as illustrated in the Figure, or part or all thereof may be provided to different transmission devices 270.

The pre-processing and estimating units 611-n (where n is an integer of 1 or larger and N or smaller) of the state estimating device 610 acquire signal reception data such as constellation data from the reception units 212-n of the transmission device 270, for each wavelength, the pre-processing and estimating unit 611-(N+1) acquires the same from the reception unit 272 of the transmission device 270, and generate feature data. The pre-processing and estimating units 611-n estimate abnormal states of the cores 311-n on the basis of the feature data for each wavelength, and output the estimation results. The pre-processing and estimating unit 611-(N+1) estimates abnormal states of the multimode fiber 340 on the basis of the feature data for each wavelength, and outputs the estimation results. The integrated estimating unit 612 comprehensively judges the estimation results for each wavelength output from each of the pre-processing and estimating units 611-1 to 611-(N+1), and derives state estimation results for the transmission path 304.

Twentieth Embodiment

In the present embodiment, light signals are transmitted in both directions over each of a plurality of physical paths that the transmission path is provided with, and state estimation is performed.

Figure 22:
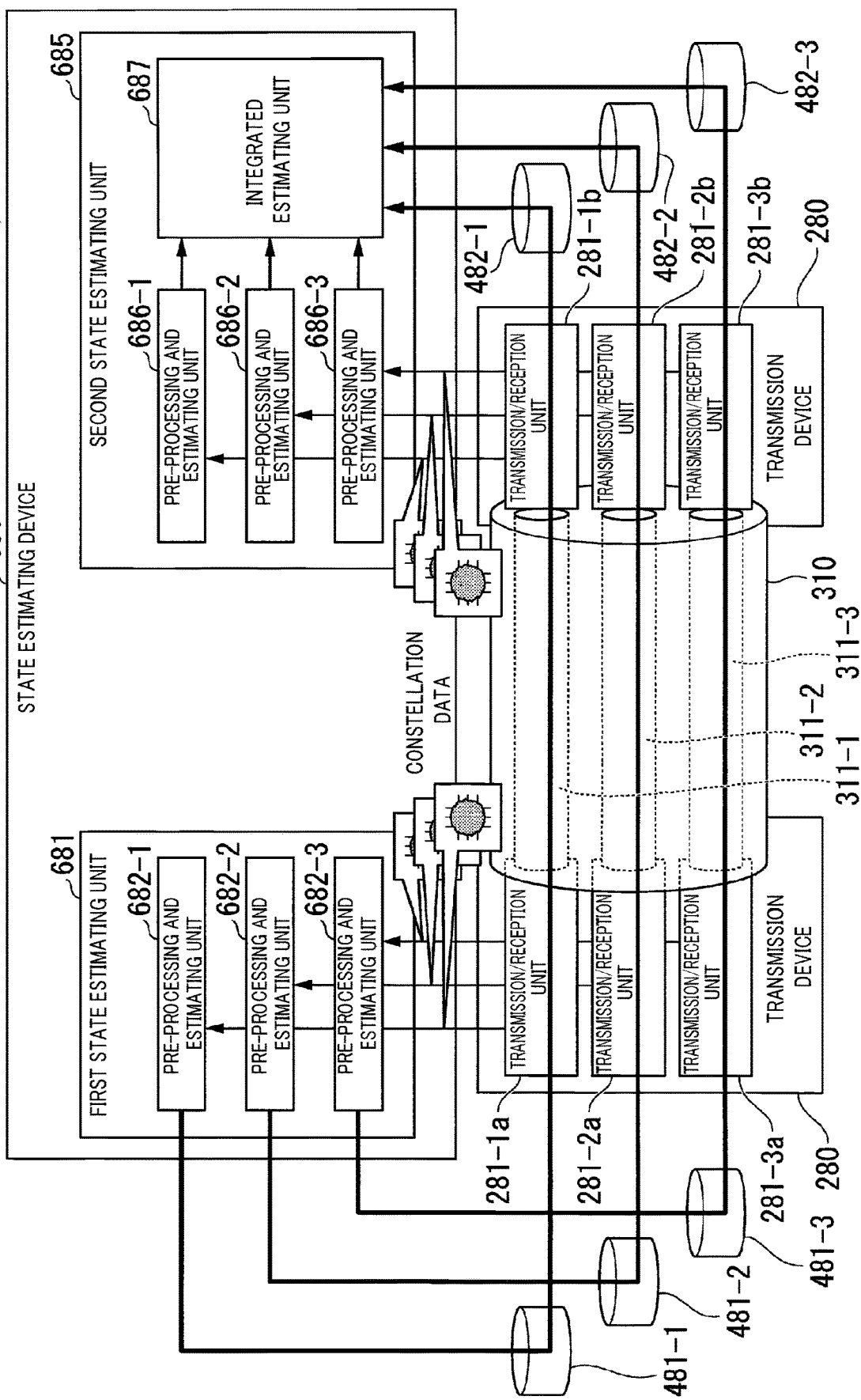
FIG. 22 is a block diagram illustrating a configuration of a communication system according to a twentieth embodiment.

FIG. 22 is a diagram illustrating a communication system 118 according to a twentieth embodiment. The communication system 118 is provided with transmission devices 280, a state estimating device 680 and data communication entities 481 and 482. The number of transmission devices 280 that the communication system 118 is provided with is optional. The transmission devices 280 perform data communication via the multicore fiber 310.

The transmission devices 280 are provided with one or more transmission/reception units 281. The transmission/reception units 281 have the functions of the transmission unit 211 and reception unit 212 that the transmission device 210 according to the thirteenth embodiment is provided with. The transmission/reception units 281 may have the functions of the transmission unit 231 and reception unit 232 that the transmission device 230 according to the fifteenth embodiment is provided with.

Pairs of transmission/reception units 281 are connected by cores 311 of the multicore fiber 310.

This is the same as two sets of transmission units and reception units being disposed on one core 311, facing each other. In the Figure, transmission/reception units 281 connected to one end of the cores 311-n (where n is an integer of 1 or larger and N or smaller, N=3 in the Figure) are written as transmission/reception unit 281-na, and transmission/reception units 281 connected to the other end are written as transmission/reception unit 281-nb. The transmission/reception unit 281-1a to 281-Na may be provided to one transmission device 280 as illustrated in the Figure, or part or all thereof may be provided to different transmission devices 280. In the same way, the transmission/reception unit 281-1b to 281-Nb may be provided to one transmission device 280 as illustrated in the Figure, or part or all thereof may be provided to different transmission devices 280.

The state estimating device 680 has a first state estimating unit 681 and a second state estimating unit 685.

The first state estimating unit 681 and second state estimating unit 685 are realized by, for example, a separate computer device, separate hardware, or the like.

The first state estimating unit 681 is provided with pre-processing and estimating units 682-1 to 682-N. The pre-processing and estimating units 682 have functions similar to the pre-processing and estimating units 611 that the state estimating device 610 according to the thirteenth embodiment is provided with. The second state estimating unit 685 is provided with pre-processing and estimating units 686-1 to 686-N and an integrated estimating unit 687. The pre-processing and estimating units 686 have functions similar to the pre-processing and estimating units 611 that the state estimating device 610 according to the thirteenth embodiment is provided with. The integrated estimating unit 687 comprehensively judges the state estimation results of the multicore fiber 310 using estimation results output from each of the pre-processing and estimating units 682-1 to 682-N and pre-processing and estimating units 686-1 to 686-N, and derives state estimation results for the multicore fiber 310.

The data communication entities 481-*n* (where n is an integer of 1 or larger and N or smaller) transmits estimation results output by the pre-processing and estimating units 682-*n* to the data communication entities 482-*n*. The data communication entities 482-*n* output the estimation results received from the data communication entities 481-*n* to the integrated estimating unit 687.

The transmission/reception units 281-*na* (where n is an integer of 1 or larger and N or smaller) output light signals to the cores 311-*n* of the multicore fiber 310, and the transmission/reception units 281-*nb* receive the light signals via the cores 311-*n*. The pre-processing and estimating units 686-*n* of the second state estimating unit 685 acquire signal reception data such as constellation data from the transmission/reception units 281-*nb* and generate feature data, and output estimation results of abnormal states of the cores 311-*n* estimated on the basis of the generated feature data to the integrated estimating unit 687.

Also, transmission/reception units 281-*nb* (where n is an integer of 1 or larger and N or smaller) output light signals to cores 311-*n* of the multicore fiber 310, and transmission/reception units 281-*na* receive these light signals via the cores 311-*n*. The pre-processing and estimating units 682-*n* of the first state estimating unit 681 acquire data such as constellation data from the transmission/reception units 281-*na* and generate feature data, and output estimation results of abnormal states of the cores 311-*n* estimated on the basis of the generated feature data to the integrated estimating unit 687 of the second state estimating unit 685 via the data communication entities 481-*n* and data communication entities 482-*n*.

The integrated estimating unit 687 derives state estimation results for the multicore fiber 310 on the basis of estimation results for each of both directions of the cores 311-1 to 311-N output from the pre-processing and estimating units 682-1 to 682-N and the pre-processing and estimating units 686-1 to 686-N. The integrated estimating unit 687 uses machine learning such as statistical estimation or classical rule-based AI, neural networks, and so forth, for example, to derive the state estimation results.

Thus, according to the present embodiment, two sets of transmission unit and reception unit are disposed in a manner facing each other across each core 311 of the multicore fiber 310, and a pre-processing unit and estimating unit are provided for each set of transmission unit and reception unit. Further, the data communication entities 481 and 482 are provided for transmitting results of the estimating units, and estimation results at both ends of the multicore fiber 310 can be collected at a single integrated estimating unit 687. Using estimation results at both ends of the multicore fiber 310 enables state estimation sensitivity of the transmission path to be improved. In particular, improvement in state estimation sensitivity similar to the example described regarding the communication system 112 according to the fourteenth embodiment can be anticipated in a case of two transmission units that face each other across a single core 311 using light signals of the same wavelength.

Twenty-First Embodiment

In the twentieth embodiment, light signals are transmitted in both directions over each of a plurality of physical paths that the transmission path is provided with, and the integrated estimating unit comprehensively judges results of performing state estimation for each of both directions of the physical paths to derive state estimation results for the transmission path. In the present embodiment, integrated estimating units are provided on each of the both ends of the transmission path, and state estimation of the transmission path is comprehensively performed on the basis of estimation results by the integrated estimating units at both ends, thereby improving state estimation sensitivity.

Figure 23:
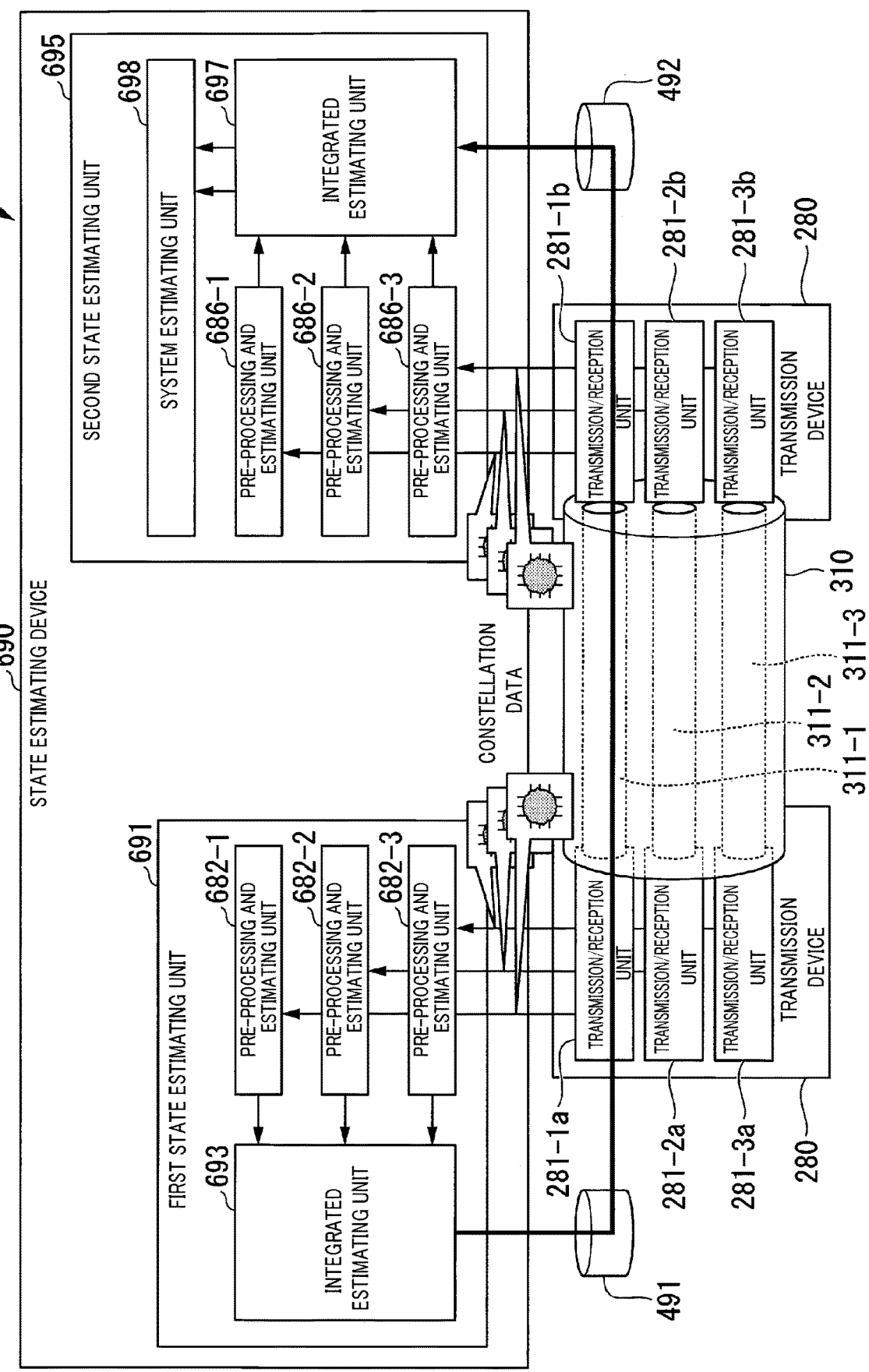
FIG. 23 is a block diagram illustrating a configuration of a communication system according to a twenty-first embodiment.
Figure 24:
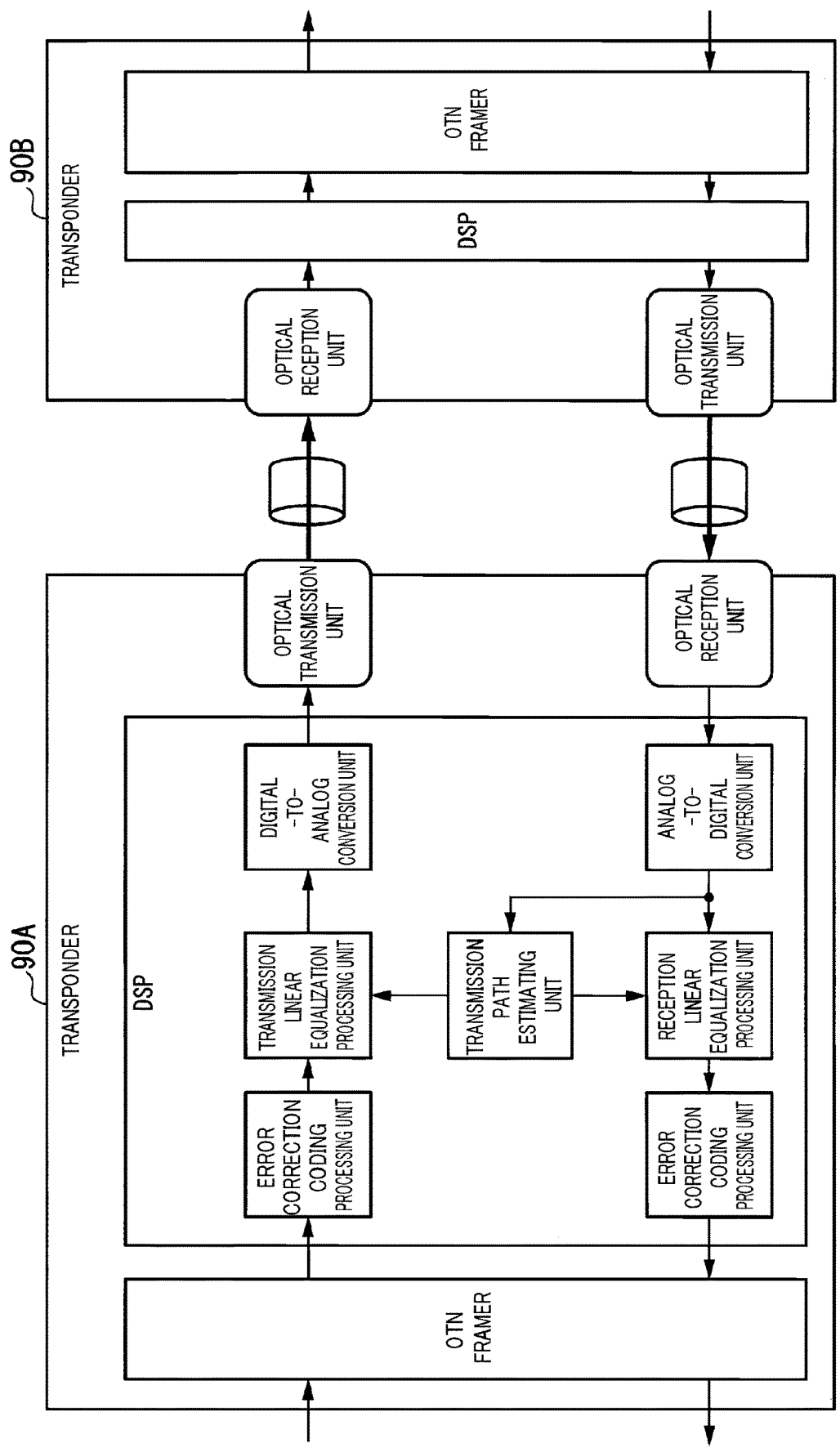
FIG. 24 is a diagram illustrating an optical communication system according to an optical digital coherent method of conventional technology.

FIG. 23 is a diagram illustrating a communication system 119 according to a twenty-first embodiment. In this Figure, parts that are the same as the communication system 118 according to the twentieth embodiment illustrated in FIG. 22 are denoted by the same symbols, and description thereof will be omitted. The communication system 119 is provided with the transmission devices 280, a state estimating device 690, and data communication entities 491 and 492.

The state estimating device 690 has a first state estimating unit 691 and a second state estimating unit 695.

The first state estimating unit 691 and second state estimating unit 695 are realized by, for example, a separate computer device, separate hardware, or the like. The first state estimating unit 691 is provided with pre-processing and estimating units 682-1 to 682-N (where N=3 in the Figure) and an integrated estimating unit 693. The integrated estimating unit 693 has functions similar to the integrated estimating unit 612 that the state estimating device 610 according to the thirteenth embodiment is provided with. The second state estimating unit 695 is provided with the pre-processing and estimating units 686-1 to 686-N and an integrated estimating unit 697, and a system estimating unit 698. The integrated estimating unit 697 has functions similar to the integrated estimating unit 612 that the state estimating device 610 according to the thirteenth embodiment is provided with. The system estimating unit 698 comprehensively takes estimation results from the integrated estimating unit 693 of the first state estimating unit 691 and estimation results from the integrated estimating unit 697 of the second state estimating unit 695, and derives state estimation results for the entire transmission path.

The data communication entity 491 transmits estimation results output by the integrated estimating unit 693 of the first state estimating unit 691 to the data communication entity 492. The data communication entity 492 outputs estimation results received from the data communication entity 491 to the system estimating unit 698 of the second state estimating unit 695.

The transmission/reception units 281-*na* (where n is an integer of 1 or larger and N or smaller) output light signals to the cores 311-*n* of the multicore fiber 310, and the transmission/reception units 281-*nb* receive these light signals via the cores 311-*n*. The pre-processing and estimating units 686-*n* of the second state estimating unit 695 acquire signal reception data such as constellation data from the transmission/reception units 281-*nb* and generate feature data, and output estimation results of abnormal states of the cores 311-*n* estimated on the basis of the generated feature data to the integrated estimating unit 697. The integrated estimating unit 697 comprehensively judges state estimation results for the multicore fiber 310 using estimation results output from each of the pre-processing and estimating units 686-1 to 686-N, and derives state estimation results for the multicore fiber 310. The integrated estimating unit 697 outputs the state estimation results to the system estimating unit 698.

Also, the transmission/reception units 281-*nb* (where n is an integer of 1 or larger and N or smaller) output light signals to cores 311-*n* of the multicore fiber 310, and transmission/reception units 281-*na* receive these light signals via the cores 311-*n*. The pre-processing and estimating units 682-*n* of the first state estimating unit 691 acquire data such as constellation data from the transmission/reception units 281-*na* and generate feature data, and output estimation results of abnormal states of the cores 311-*n* estimated on the basis of the generated feature data to the integrated estimating unit 693. The integrated estimating unit 693 comprehensively judges state estimation results for the multicore fiber 310 using estimation results output from each of the pre-processing and estimating units 682-1 to 682-N, and derives state estimation results for the multicore fiber 310. The integrated estimating unit 693 outputs the state estimation results to the system estimating unit 698 of the second state estimating unit 695 via the data communication entity 491 and data communication entity 492. The system estimating unit 698 comprehensively takes the estimation results from the integrated estimating unit 693 and the estimation results from the integrated estimating unit 697, using machine learning such as statistical estimation or classical rule-based AI, neural networks, and so forth, for example, to derive the state estimation results for the entire multicore fiber 310.

Although description has been made above that integrated estimating units 693 and 697 are provided on both ends of the multicore fiber 310 and estimation results from the integrated estimating units 693 and 697 are transmitted to the system estimating unit 698, an arrangement may be made where, instead of or in addition to these estimation results, signal reception data such as constellation data acquired from the cores at both ends of the multicore fiber 310, and feature data generated by subjecting the constellation data to pre-processing, may be transmitted to the system estimating unit 698.

The system estimating unit 698 can perform comprehensive state estimation of the transmission path further using such information in addition to the estimation results from the integrated estimating units 693 and 697, and improve state estimation sensitivity.

According to the above-described embodiments, the state of the transmission path or transmission devices including transmission units and reception units can be estimated, by detecting the cause leading to failure occurring and the degree thereof, regardless of the transmission path medium. For example, a state estimating device can estimate the state of the transmission path such as one or both of whether or not there is an unintended bending state of the transmission path and the radius of bending, temperature change, and so forth, or abnormal states of transmission devices including transmission units and reception units without interrupting data transmission and reception by the user. Accordingly, preliminary indication of failure can be detected, and recovery work can be promptly performed at the time of a failure occurring.

The state estimating devices 510, 520, 530, 540, 550, 560, 570, 580, 590, 595, and 610, the first state estimating units 681 and 691, and the second state estimating units 685 and 695 in the above-described embodiments have a CPU (Central Processing Unit), memory, auxiliary storage device, and so forth, that are connected by a bus, and realize the functions in the above-described embodiments by executing a state estimating program. Note that all or part of the functions of the state estimating devices 510, 520, 530, 540, 550, 560, 570, 580, 590, 595, and 610, the first state estimating units 681 and 691, and the second state estimating units 685 and 695 may be realized using hardware such as an ASIC (Application Specific Integrated Circuit), a PLD (Programmable Logic Device), an FPGA (Field Programmable Gate Array), or the like. The state estimating program may be recorded in a computer-readable storage medium. Examples of the computer-readable storage medium include transportable media such as a flexible disk, optomagnetic disk, ROM, CD-ROM, and so forth, and storage devices such as hard disks built into a computer system, and so forth. The state estimating program may be transmitted over an electric communication line.

The transmission device 200 may be internally provided with the state estimating devices 510, 520, 530, 540, 550, 560, 570, 580, 590, and 595, or the transmission device 200 may be provided with part of the functions of the state estimating devices 510, 520, 530, 540, 550, 560, 570, 580, 590, and 595. For example, a CPU or electronic circuit or the like for control of the reception unit 202 that the transmission device 200 is provided with may be used to execute data processing and estimation processing at the state estimating devices 510, 520, 530, 540, 550, 560, 570, 580, 590, and 595. Also, the state estimating device 610 may be internally provided in the transmission devices 210, 220, 230, 240, 260, and 270, or may be provided with part of the functions of the state estimating device 610. Further, the transmission device 280 may be internally provided with the first state estimating unit 681 and 691 and the second state estimating unit 685 and 695, or may be provided with part of the functions of the first state estimating unit 681 and 691 and the second state estimating unit 685 and 695.

According to the above-described embodiments, the state estimating device has a pre-processing unit and estimating unit. The pre-processing unit and estimating unit are realized by hardware, by a processor such as a CPU or the like executing a software program, or by a combination thereof. The pre-processing unit acquires signal reception data representing one or more of the phase of signals transmitted from a transmission unit of a transmission device and received at a reception unit of another transmission device via a transmission path, the reception strength (e.g., reception power, Q factor), reception quality (e.g., BER value, OSNR value, ESNR value), voltage after conversion into electric signals (voltage amplitude value of Rx electric signals), and signal processing parameters used in reception processing at the reception unit (e.g., Rx equalizer tap coefficients), and subjects the acquired signal reception data to statistical processing, for example, thereby processing into feature data used for state estimation. Feature data includes at least one of phase plane state data representing the phase on a phase plane, polar coordinate data representing the phase on a polar coordinates plane, Fourier transform data where polar coordinate data has been subjected to fast Fourier transform, histogram data representing the rate of occurrence of signals in phase plane state data or polar coordinate data, histogram data representing the rate of occurrence of signals in any one of or a combination of any two or more of reception strength, reception quality, voltage, and signal processing parameters, and time-series data representing change in a time series of reception strength, reception quality, voltage, or signal processing parameters. The estimating unit estimates the state of the transmission path, abnormal state of the transmission unit, or abnormal state of the reception unit, on the basis of feature data that the pre-processing unit has generated. The state of the transmission path is one or more of whether or not there is any bending, radius of bending, temperature change, tension, splicing point offset, vibrations, water seepage, and twisting.

The estimating unit can perform estimation using machine learning such as statistical estimation or classical rule-based AI, neural networks, and so forth. The estimating unit may have a plurality of partial estimating units that estimate a part of a state included in any one of the state of the transmission path, an abnormal state of the transmission unit, and an abnormal state of the reception unit, using at least part of feature data, and estimate the state of the transmission path, an abnormal state of the transmission unit, or an abnormal state of the reception unit, on the basis of estimation results by the plurality of partial estimating units that each estimate a different part of a state. For example, the partial estimating units may estimate two states, such as the recognition functions #1 to #n that the estimating unit 592 is provided with, or may estimate two or more states, such as the recognition functions #1 to #n that the estimating unit 597 is provided with.

In a case where the transmission path is configured of a plurality of physical paths, the pre-processing unit acquires signal reception data for each physical path, generates feature data to be used for state estimation from the acquired signal reception data, and the estimating unit estimates the state of the physical path on the basis of the feature data, for each physical path. The integrated estimating unit of the state estimating device derives state estimation results of the transmission path on the basis of the state of each physical path estimated by the estimating unit.

Note that the pre-processing unit may acquire signal reception data for each physical path when light signals using the same light source are transmitted to two or more, or all, of the plurality of physical paths, and may acquire signal reception data for each physical path when light signals using different light sources for each of the plurality of physical paths are transmitted to each of the plurality of physical paths.

The transmission path configured of a plurality of physical paths is any one of, or a combination of two or more of, multicore fiber, multimode fiber, and multifiber, for example. Alternatively, the transmission path may have a mode multiplexer that multiplexes a plurality of single mode light signals so as to be converted into multimode light signals, a multimode fiber that transmits the multimode light signals converted by the mode multiplexer, and a mode demultiplexer that demultiplexes the multimode light signals transmitted over the multimode fiber into single-mode light signals.

The pre-processing unit may acquire signal reception data at the time of transmitting light signals in each of both directions for each physical path, and generates feature data to be used for state estimation from the acquired signal reception data. The estimating unit estimates the state of the physical paths on the basis of the feature data, regarding each of both directions for each physical path. The integrated estimating unit derives state estimation results for the transmission path on the basis of the state of each physical path estimated regarding each of both directions by the estimating unit.

Although embodiments of this invention have been described in detail with reference to Figures, specific configurations are not restricted to these embodiments, and designs and so forth that do not depart from the spirit and scope of this invention are also included.

INDUSTRIAL APPLICABILITY

Application can be made to state detection of a transmission path and transmission device.

REFERENCE SIGNS LIST

101, 102, 103, 104, 105, 106, 107, 111, 112, 113, 114, 115, 116,
117, 118, 119 Communication system
200, 210, 220, 230, 240, 260, 270, 280 Transmission device
201, 211-1 to 211-3, 221, 231-1 to 231-3, 241, 261, 271 transmission unit
202, 212-1 to 212-3, 232-1 to 232-3, 242, 272 Reception unit
281-1a to 281-3a, 281-1b to 281-3b Transmission/reception unit
300, 304 Transmission path
310 Multicore fiber
311-1 to 311-3 Core
340 Multimode fiber
351 Mode multiplexer
352 Mode demultiplexer
481-1 to 481-3, 482-1 to 482-3, 491, 492 Data transmission entity
510, 520, 530, 540, 550, 560, 570, 580, 590, 595, 610, 680, 690 State estimating device
511, 521, 531, 541, 551, 561, 571, 581, 591, 596 Pre-processing unit
512, 522, 532, 542, 552, 562, 572, 582, 592, 597 Estimating unit
611-1 to 611-4, 682-1 to 682-3, 686-1 to 686-3 Pre-processing and estimating unit
612, 687, 693, 697 Integrated estimating unit
681, 691 First state estimating unit
685, 695 Second state estimating unit
698 System estimating unit

The invention claimed is:

1. A state estimating device, comprising:
a pre-processing unit that acquires signal reception data representing one or more of a phase of a signal transmitted from a transmitter of a transmission device and received at a receiver of another transmission device via a transmission path, a reception strength, a reception quality, a voltage after conversion into an electric signal, and a signal processing parameter used in reception processing, and generates feature data to be used for state estimation from the acquired signal reception data; and
an estimating unit that estimates a state of the transmission path, an abnormal state of the transmitter, or an abnormal state of the receiver, on the basis of the feature data,
wherein
the feature data includes at least one of phase plane state data representing a phase on a phase plane, polar coordinate data representing a phase on a polar coordinates plane, Fourier transform data where the polar coordinate data has been subjected to fast Fourier transform, histogram data representing a rate of occurrence of the phase plane state data or the polar coordinate data, histogram data representing a rate of occurrence of the signals in any one of or a combination of two or more of the reception strength, the reception quality, the voltage, and the signal processing parameter, and time-series data representing change in a time series of the reception strength, the reception quality, the voltage, or the signal processing parameter, wherein each of the pre-processing unit and the estimating unit is implemented by:

i) computer executable instructions executed by at least one processor, ii) at least one circuitry or iii) a combination of computer executable instructions executed by at least one processor and at least one circuitry.

2. The state estimating device according to claim 1, wherein the estimating unit performs estimation using machine learning.

3. A communication system comprising: a transmission device; and the state estimating device according to claim 1.

4. The state estimating device according to claim 1, wherein the state of the transmission path is one or more of whether or not there is any bending, a radius of bending, and a temperature change.

5. A state estimating device, comprising:

a pre-processing unit that acquires signal reception data representing one or more of a phase of a signal transmitted from a transmitter of a transmission device and received at a receiver of another transmission device via a transmission path, a reception strength, a reception quality, a voltage after conversion into an electric signal, and a signal processing parameter used in reception processing, and generates feature data to be used for state estimation from the acquired signal reception data; and an estimating unit that estimates a state of the transmission path, an abnormal state of the transmitter, or an abnormal state of the receiver, on the basis of the feature data, wherein the estimating unit has a plurality of partial estimating units that estimate a part of a state included in any one of a state of the transmission path, an abnormal state of the transmitter, and an abnormal state of the receiver, using at least part of the feature data, and estimates the state of the transmission path, an abnormal state of the transmitter, or an abnormal state of the receiver, on the basis of estimation results by the plurality of partial estimating units that each estimate a different part of a state, wherein each of the pre-processing unit, the estimating unit and the partial estimating units are implemented by:

i) computer executable instructions executed by at least one processor, ii) at least one circuitry or iii) a combination of computer executable instructions executed by at least one processor and at least one circuitry.

6. The state estimating device according to claim 5, wherein the state of the transmission path is one or more of whether or not there is any bending, a radius of bending, and a temperature change.

7. The state estimating device according to claim 5, wherein the estimating unit performs estimation using machine learning.

8. A communication system comprising: a transmission device; and the state estimating device according to claim 5.

9. A state estimating device, comprising:

a pre-processing unit that acquires signal reception data representing one or more of a phase of a signal transmitted from a transmitter of a transmission device and received at a receiver of another transmission device via a transmission path, a reception strength, a reception quality, a voltage after conversion into an electric signal, and a signal processing parameter used in reception processing, and generates feature data to be used for state estimation from the acquired signal reception data; and an estimating unit that estimates a state of the transmission path, an abnormal state of the transmitter, or an abnormal state of the receiver, on the basis of the feature data, wherein the transmission path is configured of a plurality of physical paths, wherein the pre-processing unit acquires the signal reception data for each of the physical paths, and generates feature data to be used for state estimation from the acquired signal reception data, wherein the estimating unit estimates a state of the physical path on the basis of the feature data, for each of the physical paths, the state estimating device further comprising: an integrated estimating unit that derives state estimation results of the transmission path on the basis of the state of each of the physical paths estimated by the estimating unit, wherein each of the pre-processing unit, the estimating unit and the integrated estimating unit is implemented by:

i) computer executable instructions executed by at least one processor, ii) at least one circuitry or iii) a combination of computer executable instructions executed by at least one processor and at least one circuitry.

10. The state estimating device according to claim 9, wherein the pre-processing unit acquires the signal reception data for each of the physical paths when light signals using the same light source are transmitted to two or more, or all, of the plurality of physical paths.

11. The state estimating device according to claim 9, wherein the pre-processing unit acquires the signal reception data for each of the physical paths when light signals using different light sources are transmitted to each of the plurality of physical paths.

12. The state estimating device according to claim 9, wherein the transmission path is any one of, or a combination of two or more of, multicore fiber, multimode fiber, and multifiber.

13. The state estimating device according to claim 9, wherein the transmission path has a mode multiplexer that multiplexes a plurality of single mode light signals so as to be converted into multimode light signals, a multimode fiber that transmits the multimode light signals converted by the mode multiplexer, and a mode demultiplexer that demultiplexes the multimode light signals transmitted over the multimode fiber into single-mode light signals.

14. The state estimating device according to claim 9, wherein the pre-processing unit acquires the signal reception data at the time of transmitting light signals in each of both directions for each of the physical paths, and generates feature data to be used for state estimation from the acquired signal reception data, the estimating unit estimates the state of the physical paths on the basis of the feature data, regarding each of both directions for each of the physical paths, and the integrated estimating unit derives state estimation results for the transmission path on the basis of the state of each of the physical paths estimated regarding each of both directions by the estimating unit.

15. A communication system comprising: a transmission device; and the state estimating device according to claim 9.

16. A state estimating device, comprising:

a pre-processing unit that acquires a first signal reception data which is a signal processing parameter value used in reception processing for a signal transmitted from a transmitter of a transmission device and received at a receiver of another transmission device via a transmission path, or acquires a second signal reception data including one or more of a phase of the signal, a reception strength, a reception quality, a voltage after conversion into an electric signal and the signal processing parameter value, and generates feature data to be used for state estimation from the acquired the first signal reception data or the second signal reception data; and an estimating unit that estimates a state of the transmission path, an abnormal state of the transmitter, or an abnormal state of the receiver, on the basis of the feature data, wherein each of the pre-processing unit and the estimating unit is implemented by:

i) computer executable instructions executed by at least one processor, ii) at least one circuitry or iii) a combination of computer executable instructions executed by at least one processor and at least one circuitry.

17. A state estimating device, comprising:

a pre-processing unit that acquires signal reception data representing one or more of a phase of a signal transmitted from a transmitter of a transmission device and received at a receiver of another transmission device via a transmission path, a reception strength, a reception quality, a voltage after conversion into an electric signal, and a signal processing parameter used in reception processing, and generates feature data to be used for state estimation from the acquired signal reception data; and an estimating unit that estimates an abnormal state of a transmission module used for the transmitter, or an abnormal state of a reception module used for the receiver, on the basis of the feature data, wherein each of the pre-processing unit and the estimating unit is implemented by:

i) computer executable instructions executed by at least one processor, ii) at least one circuitry or iii) a combination of computer executable instructions executed by at least one processor and at least one circuitry.

* * * * *